(12) United States Patent
Hanamura et al.

(10) Patent No.: US 8,368,254 B2
(45) Date of Patent: *Feb. 5, 2013

(54) LINEAR MOTOR AND COMPONENT TRANSFER APPARATUS

(75) Inventors: Naoki Hanamura, Shizuoka (JP); Kiyotaka Sakai, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 289 days.

This patent is subject to a terminal disclaimer.

(21) Appl. No.: 12/742,885

(22) PCT Filed: Jan. 7, 2009

(86) PCT No.: PCT/JP2009/050077
§ 371 (c)(1),
(2), (4) Date: May 13, 2010

(87) PCT Pub. No.: WO2009/088015
PCT Pub. Date: Jul. 16, 2009

(65) Prior Publication Data
US 2010/0290871 A1 Nov. 18, 2010

(30) Foreign Application Priority Data
Jan. 11, 2008 (JP) ................................. 2008-004076

(51) Int. Cl.
*H02K 41/02* (2006.01)
(52) U.S. Cl. ............... 310/12.02; 310/12.15; 310/12.19; 310/12.33
(58) Field of Classification Search ............... 310/12.09, 310/12.21, 12.31
See application file for complete search history.

(56) References Cited

U.S. PATENT DOCUMENTS 4,906,878 A * 3/1990 Twaalfhoven et al. ..... 310/12.29
6,472,777 B1 * 10/2002 Teng et al. ................. 310/12.19
(Continued)

FOREIGN PATENT DOCUMENTS
DE 196 50 360 A1 5/1998
EP 1 615 322 A1 1/2006
(Continued)

OTHER PUBLICATIONS
JP 11-043852 Machine Translation, Jun. 15, 2012.*
(Continued)

*Primary Examiner* — Quyen Leung
*Assistant Examiner* — Thomas Truong
(74) *Attorney, Agent, or Firm* — Studebaker & Brackett PC; Donald R. Studebaker

(57) ABSTRACT

The present invention relates to a linear motor provided with a magnetic body and an armature and adapted to produce a force causing the magnetic body and the armature to be relatively displaced in a given moving direction by interaction of magnetic fluxes generated between the magnetic body and the armature during an operation of supplying electric power to the armature. The linear motor is provided with: a base plate adapted to set the moving direction on a base surface thereof; a movable section attached to the base plate in a relatively movable manner reciprocating along the moving direction with respect to the base plate; a mover provided on and along a lateral surface of the movable section on a one edge side in a widthwise direction of the base surface perpendicular to the moving direction, and formed as one of the magnetic body and the armature; and a stator provided on the base surface of the base plate to be disposed opposed to the mover from the one edge side toward the other edge side in the widthwise direction, and formed as other one of the magnetic body and the armature to extend along the moving direction.

14 Claims, 19 Drawing Sheets

U.S. PATENT DOCUMENTS 7,456,526 B2 * 11/2008 Teramachi et al. ........ 310/12.21
2007/0096567 A1    5/2007 Miyamoto et al.
2008/0309260 A1 * 12/2008 Kanai et al. .................... 318/38

FOREIGN PATENT DOCUMENTS

| EP | 1 728 309 |   | 12/2006 |
| --- | --- | --- | --- |
| JP | 63-109586 |   | 7/1988 |
| JP | 11-043852 |   | 2/1999 |
| JP | 11-43852 A |   | 2/1999 |
| JP | 2005051856 A | * | 2/2005 |
| JP | 2006-180645 A |   | 7/2006 |
| WO | 2005/093932 A1 |   | 10/2005 |
| WO | WO 2006011341 A1 | * | 2/2006 |
| WO | 2006/068322 A1 |   | 6/2006 |

OTHER PUBLICATIONS

JP 2005-051856 Machine Translation, Jun. 15, 2012.*
JP 2006-180645 Machine Translation, Jun. 15, 2012.*
The Extended European Search Report dated Dec. 29, 2011; Application No./ Patent No. 09701033.4-1242/2224582 PCT/JP2009050077.
International Search Report; PCT/JP2009/050077; Apr. 14, 2009.

* cited by examiner

FIG.18
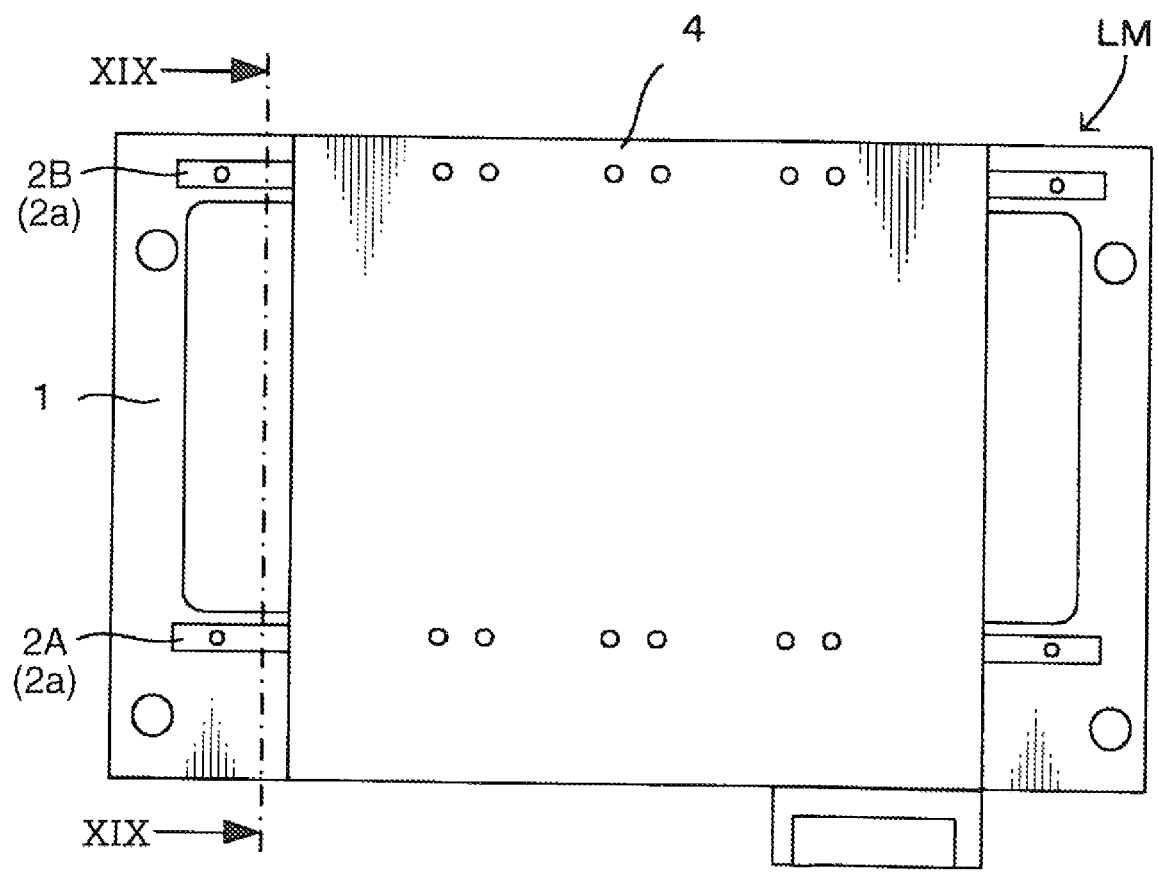
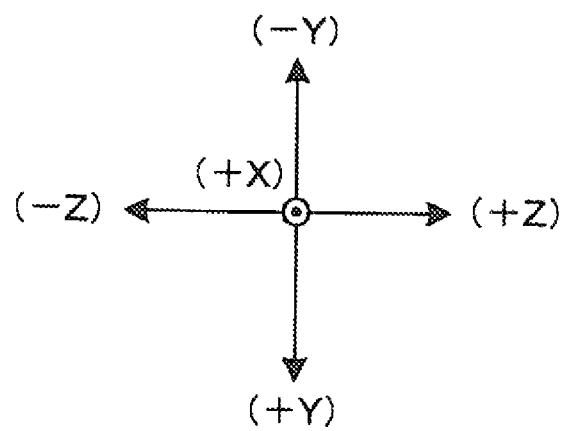

LINEAR MOTOR AND COMPONENT TRANSFER APPARATUS

TECHNICAL FIELD

The present invention relates to a linear motor and a component transfer apparatus, and more particularly to a linear motor adapted to linearly move a movable section with respect to a base plate, and a component transfer apparatus using the linear motor.

BACKGROUND ART

Primarily for use in component transfer apparatuses for handling components such as an electronic component, manufacturing apparatuses for manufacturing a semiconductor device, a liquid-crystal display device and others, etc., applications of a linear motor have been increasing year by year. Particularly, in late years, there has been a growing need for a thin-shaped high-performance linear motor. To meet such a need, a linear motor, such as a linear motor LM having a structure illustrated in FIGS. 18 and 19 (the following Non-Patent Document 1), has been proposed.

FIGS. 18 and 19 show one example of a conventional linear motor, wherein FIG. 19 is a sectional view taken along the arrowed line XIX-XIX in FIG. 18. In the following illustrative figures, XYZ rectangular coordinate axes on the basis of a linear motor LM are shown therein in order to clarify a directional relationship in each of the figures. Among the three directions X, Y, and Z, a moving direction to be set for the linear motor LM, a widthwise direction of the linear motor LM, and a frontward-rearward direction of the linear motor LM, are indicated by Z, Y, and X, respectively. Also, the signs (+, −) in each of the rectangular coordinate axes indicate a frontward side (+X side), a rearward side (−X side), a one edge side (−Y side), the other edge side (+Y side), a forward side (−Z side) and a backward side (+Z side), in the directions X, Y, and Z, for descriptive purposes.

The linear motor LM illustrated in FIGS. 18 and 19 comprises two linear guides 2A, 2B on a base plate 1. Each of the linear guides 2A, 2B has a linear-shaped rail 2a and a slider 2b, wherein the two rails 2a are provided parallel to each other along the moving direction Z while being spaced apart from each other in the widthwise direction Y, and the two sliders 2b are provided slidably along respective ones of the rails 2a in the moving direction Z. An armature 3 is provided between the linear guides 2A, 2B configured as above. The armature 3 is comprised of a plurality of densely-wound coils provided on a surface of the base plate 1 with intervals along the moving direction Z while allowing each axial core to extend along the widthwise direction Y. This armature 3 forms a stator of the linear motor LM.

Also, a plate-shaped movable base 4 having a width (length in the widthwise direction Y) equal to that of the base plate 1 is attached to both upper surfaces of the sliders 2b, so that it is adapted to be movable along the moving direction Z at a position above the base plate 1. In this manner, the movable base 4 and the two sliders 2b are adapted to be integrally movable along the moving direction Z as a "movable section".

Two yokes 5A, 5B, each having a permanent magnet array attached thereto on a respective one of opposite sides of the armature 3 along the widthwise direction Y, are attached to a rear surface of the movable base 4 to serve as a mover. Although the specific illustration is omitted, each of the yokes 5A, 5B extends in a direction perpendicular to the drawing sheet of FIG. 19, i.e., in the moving direction Z. Along with the extending direction Z of the yoke 5A (5B), plurality of permanent magnet arrays 6A and 6B are provided between the yokes 5A and 5B and the armature 3. An upper end of the yoke 5A is attached to the rear surface of the movable base 4 to allow the permanent magnet array 6A to face the armature 3 from the other edge side (+Y side) in the widthwise direction Y, and the yoke 5B is attached to the rear surface of the movable base 4 to allow the permanent magnet array 6B to face the armature 3 from the one edge side (−Y side) in the widthwise direction Y. Thus, through an operation of controlling a current to be applied to the coils of the armature 3, the movable base 4 is linearly driven in the direction Z by interaction of magnetic fluxes generated between the stator (armature 3) and the permanent magnet arrays 6A, 6B of the mover.

A detector unit 7 for detecting a position of the movable base 4 is provided on a side opposite to the mover in the widthwise direction Y (on the +Y side) with respect to the linear guide 2A. More specifically, a sensor 7a is fixedly disposed on an upper surface of the base plate 1, and a linear scale 7b is attached to a lower surface of the movable base 4 to face the sensor 7a. In this manner, the sensor 7a and the linear scale 7b are disposed opposed to each other, so that the linear motor LM can detect a position of the movable base 4 in the direction Z.

In the conventional linear motor LM, as shown in FIG. 19, the linear guide 2A, yoke 5A, the permanent magnet array 6A, the armature 3, the permanent magnet array 6B, the yoke 5B, and the linear guide 2B are arranged in the widthwise direction Y between the base plate 1 and the movable base 4, to facilitate a reduction in depth dimension of the linear motor LM (in apparatus size in the frontward-rearward direction X), as compared with a type where the armature, the permanent magnet array, the yoke and the movable base are arranged in a frontward-rearward direction with respect to the base plate. Also, the sliders 2b, the yokes 5A, 5B and the permanent magnet arrays 6A, 6B are integrally fixed to the movable base 4 to allow them to be moved back and forth along the moving direction Z with respect to the rails 2a and the armature 3 fixed to the base plate 1.

Non-Patent Document 1: Hitoshi Yamamoto, "Materials/Electronic Materials Topics 32nd Development of World's Thinnest 7 mm-Thickness Linear Motor", [online], Dec. 11, 2006, Japan Electronics and Information Technology Association, [search: Dec. 10, 2007], Internet <http://home.jeita.or.jp/ecb/material/No032.html>

DISCLOSURE OF THE INVENTION

In a linear motor adapted to move a movable section in a moving direction by interaction of magnetic fluxes generated between a stator and a mover which are provided, respectively, on a base plate and the movable section, in opposed relation to each other in a widthwise direction, it is a primary object of the present invention to drive the movable section by a sufficient propulsion force while facilitating a reduction in a depth dimension thereof.

It is another object of the present invention to provide a component transfer apparatus using the above linear motor.

One aspect of the present invention relates to a linear motor which is provided with a magnetic body and an armature, and adapted to produce a force causing the magnetic body and the armature to be relatively displaced along a given linear moving direction by interaction of magnetic fluxes generated between the magnetic body and the armature during an operation of supplying electric power to the armature. The linear motor comprises: a base plate adapted to set the moving direction on a base surface thereof; a movable section attached to the base plate in a relatively movable manner reciprocating along the moving direction with respect to the base plate; a mover disposed on a lateral surface of the movable section with respect to one side of a widthwise direction of the base surface perpendicular to the moving direction, the mover formed as one of the magnetic body and the armature; and a stator provided on the base surface of the base plate to be disposed opposed to the mover from the one edge side toward the other edge side in the widthwise direction, the stator formed as the other of the magnetic body and the armature to extend along the moving direction.

In the linear motor configured as above, the mover is disposed on a lateral surface on the movable section with respect to one side of a widthwise direction, while the stator is to face opposite to the mover from a position offset outwardly from the movable section. Thus, a thickness dimension of the movable section can be set without being constrained by the mover and the stator, so that a thickness (a thickness perpendicular to both the moving direction and the widthwise direction) of a linear motor can be reduced without reducing a thickness of each of the mover and the stator, or, reversely, while increasing a thickness of the movable section to allow the thickness of each of the mover and the stator to be increased. This makes it possible to drive the movable section by a sufficient propulsion force even if a depth dimension of a linear motor is reduced.

In contrast, the conventional linear motor illustrated in FIGS. 18 and 19 employs an arrangement where the stator is disposed at a center in the widthwise direction of the base plate, and the two movers are disposed on respective opposite side of the stator in opposed relation to the stator. Consequently, the stator and the mover have a positional relationship where they are disposed opposed to the movable section in the frontward-rearward direction, which poses restrictions on reduction in thickness of the stator and the mover. Therefore, as a prerequisite to further reducing a thickness of the linear motor LM, it is necessary to reduce a depth dimension of the movable base 4 and to reduce an opposing distance H between the base plate 1 and the movable base (i.e., reduce a height dimension of each of the permanent magnet arrays 6A, 6B and the armature 3). However, in view of ensuring the rigidity of the movable base 4, it is required to preserve the depth dimension of the movable base 4 to some extent. Moreover, a reduction in thickness of the permanent magnet arrays 6A, 6B and/or the armature 3 would cause a problem of decline in the propulsion force.

According to the present invention, it can satisfy both the conflicting needs in the conventional linear motor, and drive the movable section by a sufficient propulsion force while facilitating a reduction in depth dimension.

In cases where it is necessary to further increase a propulsion force for driving the movable section, the linear motor may further comprise a mover and a stator, where the mover is provided on the lateral surface of the movable section on the other edge side in the widthwise direction, and the stator is opposed, to the mover attached to the lateral surface, in the widthwise direction. Specifically, the linear motor may be configured such that the movable section is driven in the moving direction by interaction of magnetic fluxes generated between a first mover provided on the one lateral surface of the movable section and a first stator opposed to the first mover, and interaction of magnetic fluxes generated between a second mover provided on the other lateral surface of the movable section and a second stator opposed to the second mover.

Another aspect of the present invention relates to a component transfer apparatus for transferring a component from a component receiving section to a component mounting area. The component transfer apparatus comprises: a head unit including a base member, a nozzle shaft supported movably relative to the base member in an upward-downward direction, the nozzle shaft adapted to provide a negative pressure, supplied through a negative-pressure pipe connected to a backward end thereof, with a suction nozzle attached to a forward end thereof, and an upward/downward driving mechanism adapted to drive the nozzle shaft in the upward-downward direction; and head driving means adapted to move the head unit between a position just above the component receiving section and a position just above the component mounting area, wherein the upward/downward driving mechanism is the above linear motor, and wherein the linear motor is attached to the base member in such a manner that the moving direction becomes parallel to the upward-downward direction, and the movable section of the linear motor is coupled to the nozzle shaft.

In the component transfer apparatus configured as above, the movable section of the linear motor is coupled to the nozzle shaft, so that the nozzle shaft is driven in the upward-rearward direction by driving the movable section. In this manner, the nozzle shaft is driven using the linear motor having a large propulsion force, so that the suction nozzle attached to the forward end of the nozzle shaft can transfers a relatively heavy component as well as a lightweight component. Also, based on a reduction in thickness of the linear motor, downsizing of the component transfer apparatus can be facilitated.

These and other configurations and advantages of the present invention will become more apparent from embodiments thereof to be described with reference to the accompanying drawings.

BRIEF DESCRIPTION OF THE DRAWINGS

FIG. 18 is a diagram showing one example of a conventional linear motor.

BEST MODE FOR CARRYING OUT THE INVENTION

Figure 1:
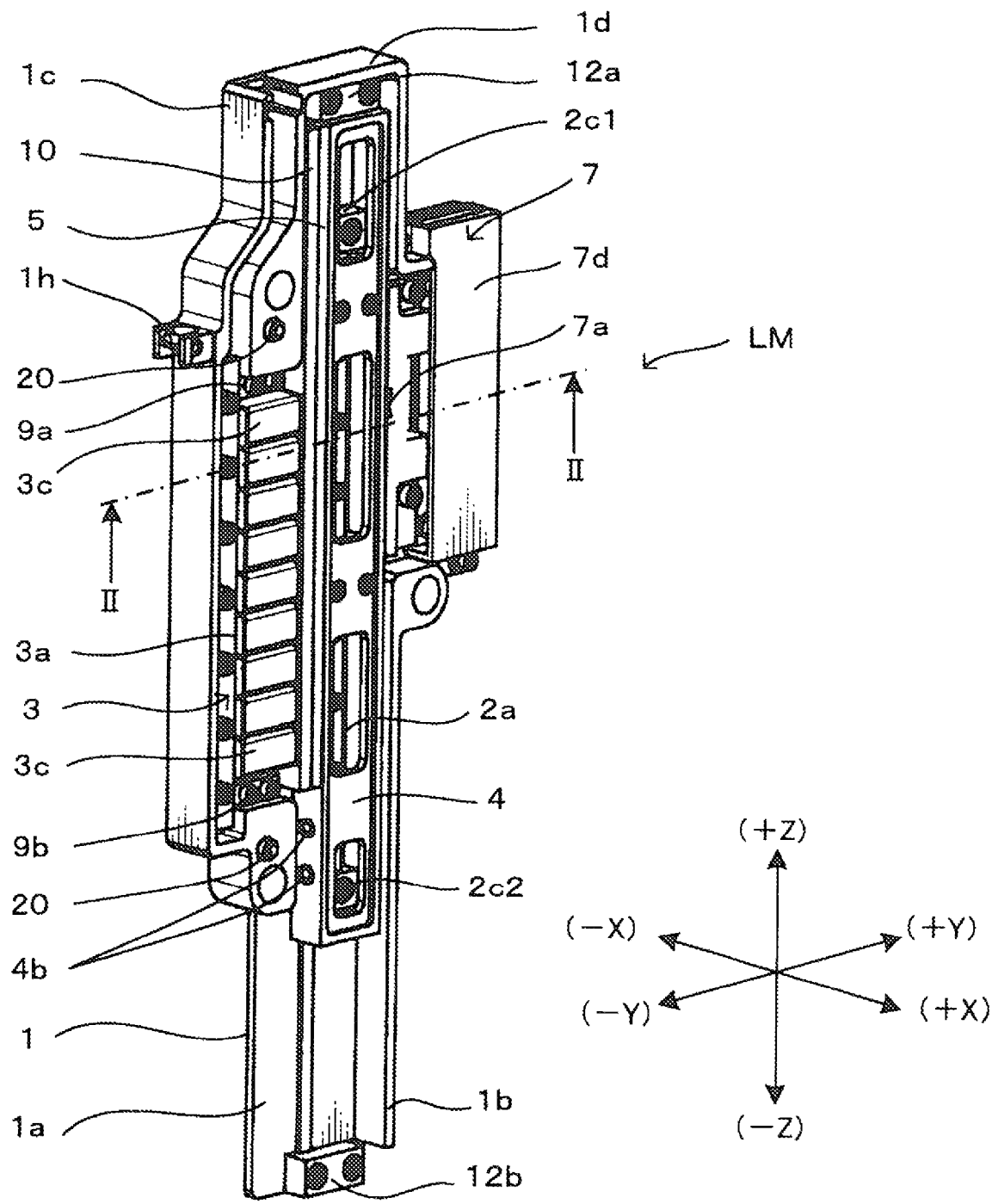
FIG. 1 is a perspective view of a linear motor according to one embodiment of the present invention.

With reference to the drawings, the best mode for carrying out the present invention will now be specifically described. In the following illustrative figures, a common reference numeral or code is assigned to equivalent elements or members, and their duplicated description will be omitted. Also, XYZ rectangular coordinate axes on the basis of a linear motor LM are shown therein in the same manner as described above.

The present invention relates to a linear motor LM adapted to linearly move a movable section with respect to a base plate, and a component transfer apparatus using the linear motor LM. In the following description, a linear motor according to an embodiment of the present invention, and a surface mounter MT according to an embodiment of the present invention, which is one example of a component transfer apparatus of the present invention, will be separately described in detail.

<Linear Motor>

Figure 2:
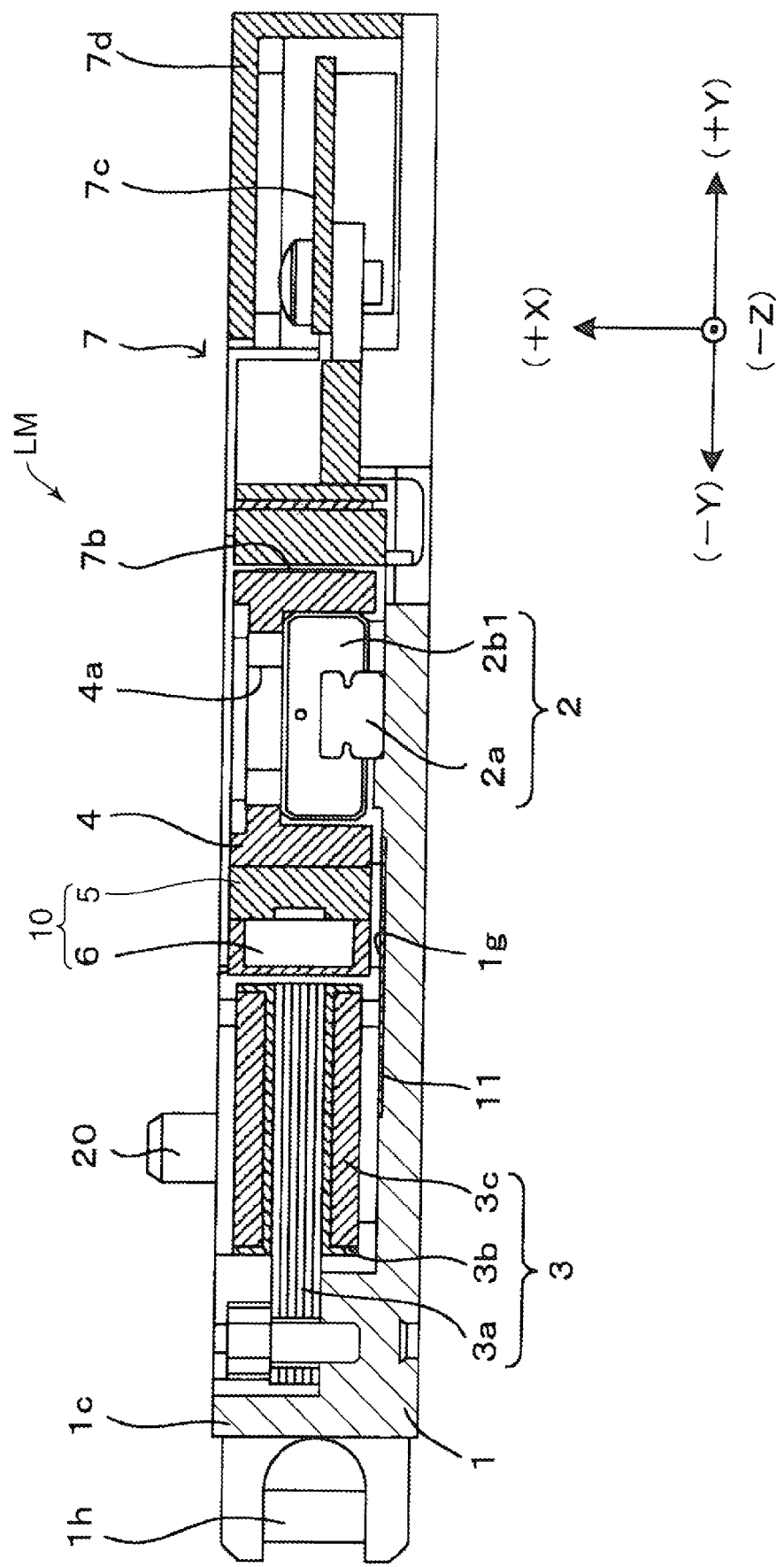
FIG. 2 is a sectional view taken along the arrowed line II-II in FIG. 1.
Figure 3:
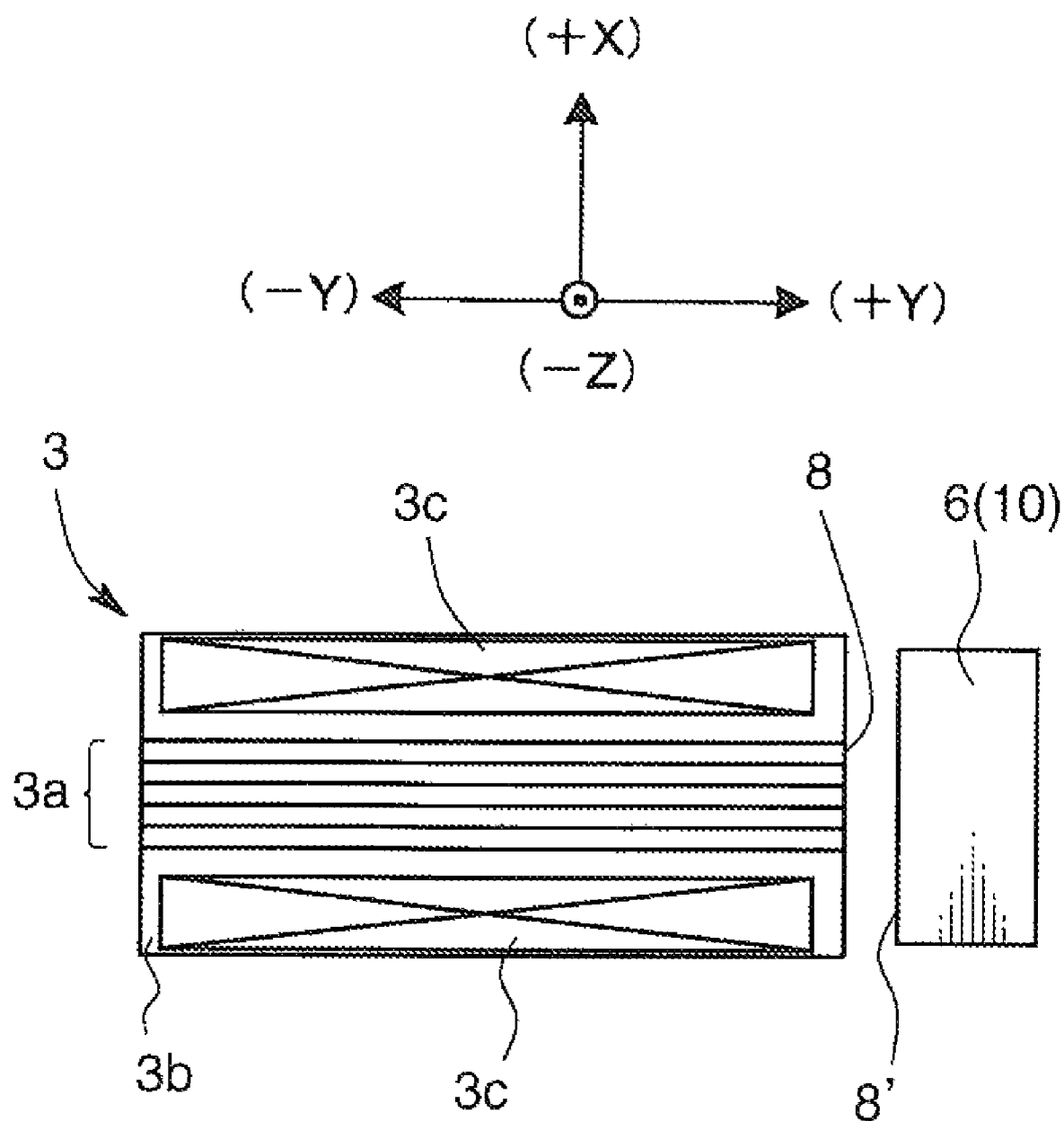
FIG. 3 is a diagram showing an arrangement relationship between an armature and a mover in the linear motor illustrated in FIG. 1.
Figure 4:
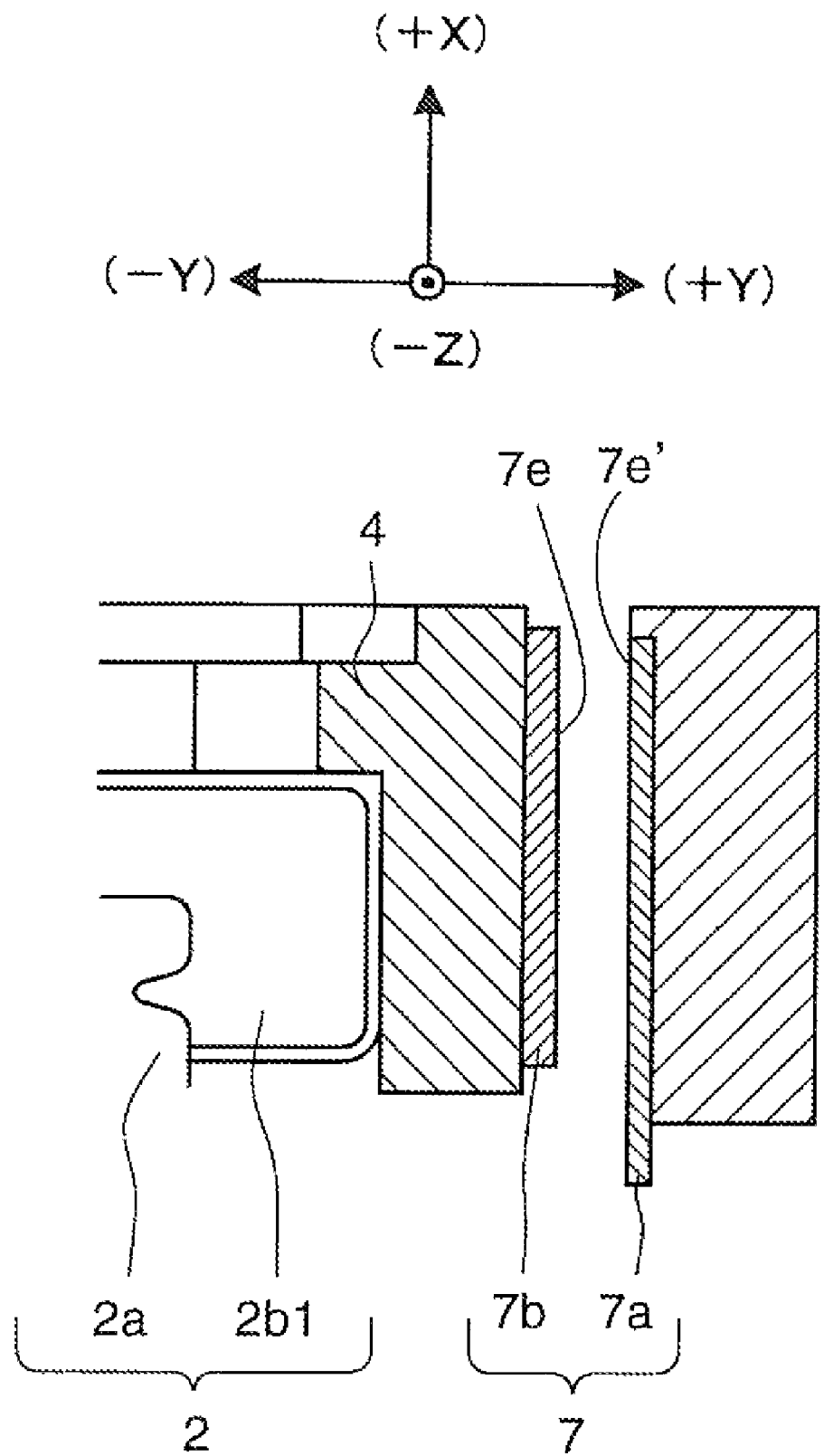
FIG. 4 is a diagram showing an arrangement relationship between a linear scale and a sensor in the linear motor illustrated in FIG. 1.
Figure 5:
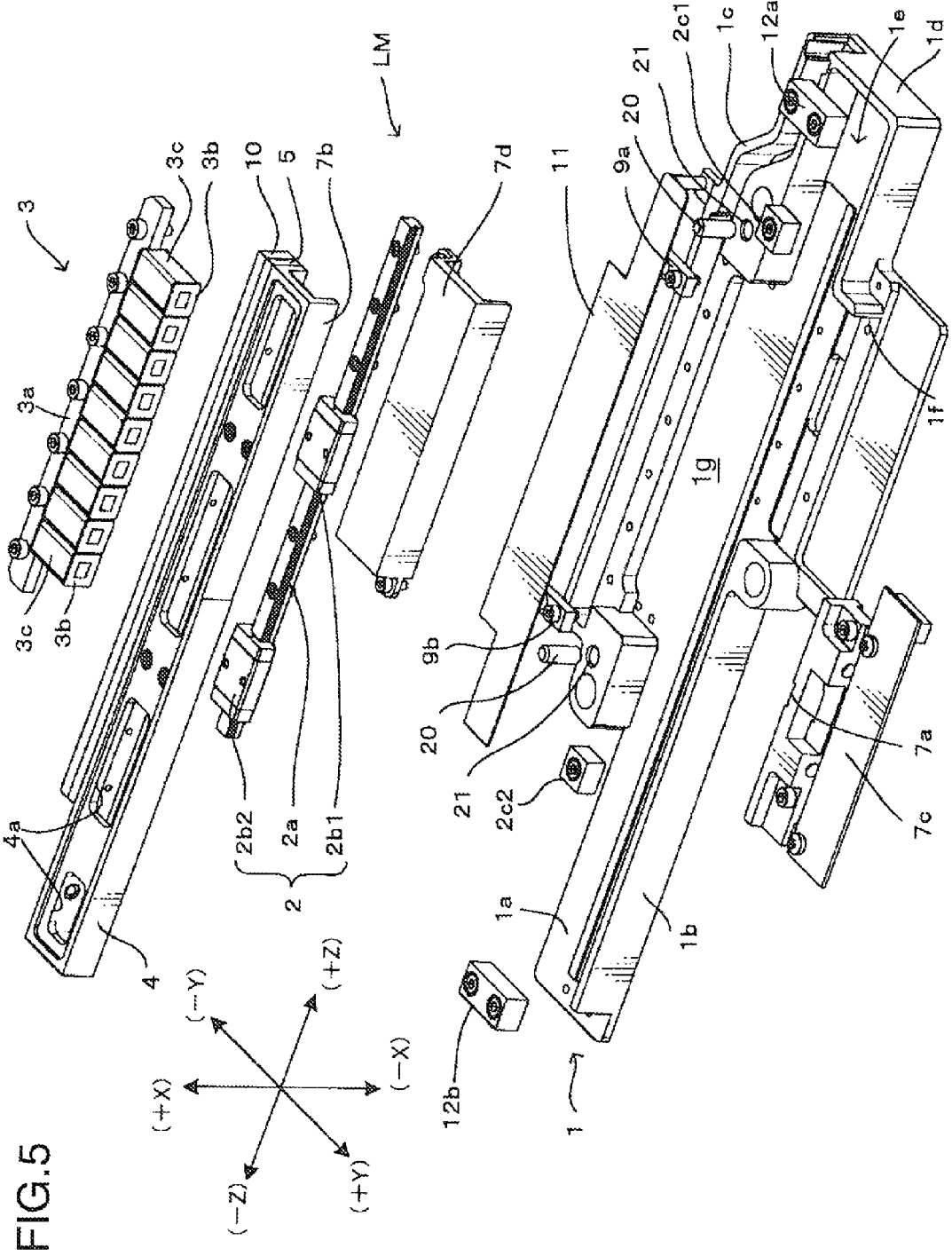
FIG. 5 is an exploded perspective view of the linear motor illustrated in FIG. 1.

Referring to FIGS. 1 to 5, the linear motor LM has a thin tray-shaped base plate 1. The base plate 1 is designed such that a longitudinal direction thereof defines a given moving direction Z. As shown in FIG. 5, an inner bottom surface of the base plate 1 is formed as a base surface 1a. Also, standing walls 1b to 1d each standing toward a frontward side (+X side) are continuously provided along edges of the base plate 1 on respective opposite sides (+Y and −Y sides) in a widthwise direction Y and along one edge of the base plate 1 on a backward side (+Z side) in the moving direction Z. The standing walls 1b to 1d and the base surface 1a form a bottomed recess portion 1e opening toward a frontward side (+X side). The recess portion 1e is one example of a receiving space for receiving therein components of the linear motor LM in an after-mentioned manner. As shown in FIGS. 1 and 2, the standing wall 1c has an intermediate portion in the longitudinal direction (moving direction Z) which is provided with a spring engagement portion 1h for engaging an end of an after-mentioned return spring. In the first embodiment, the base surface 1a and the standing walls 1b to 1d are integrally molded using an aluminum alloy or the like to form a non-magnetic base plate 1. Alternatively, the base plate 1 may be formed by producing the base surface 1a and the standing walls 1b to 1d separately and then assembling these parts together. Although the base plate 1 is made of such a non-magnetic material, it is understood that the base plate 1 may be made of a resin material. The numeral 1h in FIGS. 1 and 2 designates a spring engagement portion for allowing one of opposite ends of a return spring 17 (see FIG. 17) for biasing a movable base 4 toward the backward side (+Z side) to be attached thereto, as described later.

A single linear guide 2 is provided on the base surface 1a to extend along the moving direction Z. The linear guide 2 comprises a linear-shaped rail 2a fixed to the base plate 1 along the moving direction Z, and two sliders 2b1, 2b2 each attached to the rail 2a slidably only in the moving direction Z. Also, in order to prevent pull-out of the sliders 2b1, 2b2 from the rail 2a, two linear guide stoppers 2c1, 2c2 are attached to the base surface 1a of the base plate 1 at positions opposed to respective opposite longitudinal ends of the linear guide 2.

A movable base 4 is attached to the sliders 2b1, 2b2 to extend along the moving direction Z. The movable base 4 has an internal space having a reverse U shape in transverse section (section taken along an X-Y plane). The movable base 4 is fixed to the sliders 2b1, 2b2 while allowing a ceiling surface of the internal space to be seated on respective upper surfaces of the sliders 2b1, 2b2. To facilitate a reduction in weight of the movable base 4, a plurality of through-holes 4a in the first embodiment are formed in the ceiling surface of the movable base 4. As above, the movable base 4 and the sliders 2b1, 2b2 in the first embodiment are adapted to be integrally movable in the moving direction Z, to serve as an element equivalent to a "movable section" in the appended claims. As described later, a mover is attached to a lateral surface of an end of the movable base 4 on a first edge side (−Y side) in the widthwise direction Y. Also, a linear scale 7b is attached to a lateral surface of an end of the movable base 4 on a second edge side (+Y side) in the widthwise direction Y.

Figure 6:
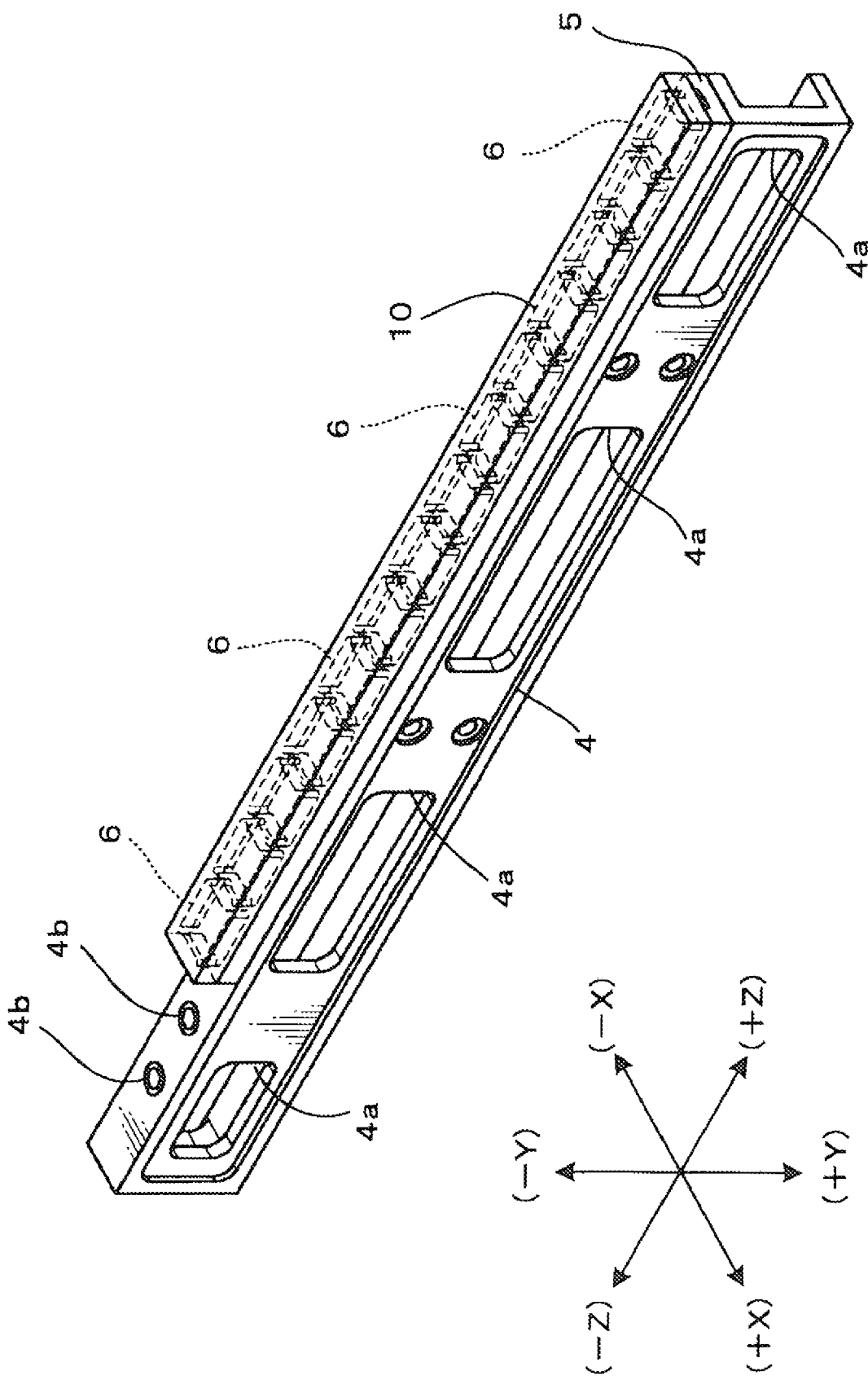
FIG. 6 is a perspective view showing an assembled structure of a movable member and the mover in the linear motor illustrated in FIG. 1.
Figure 7:
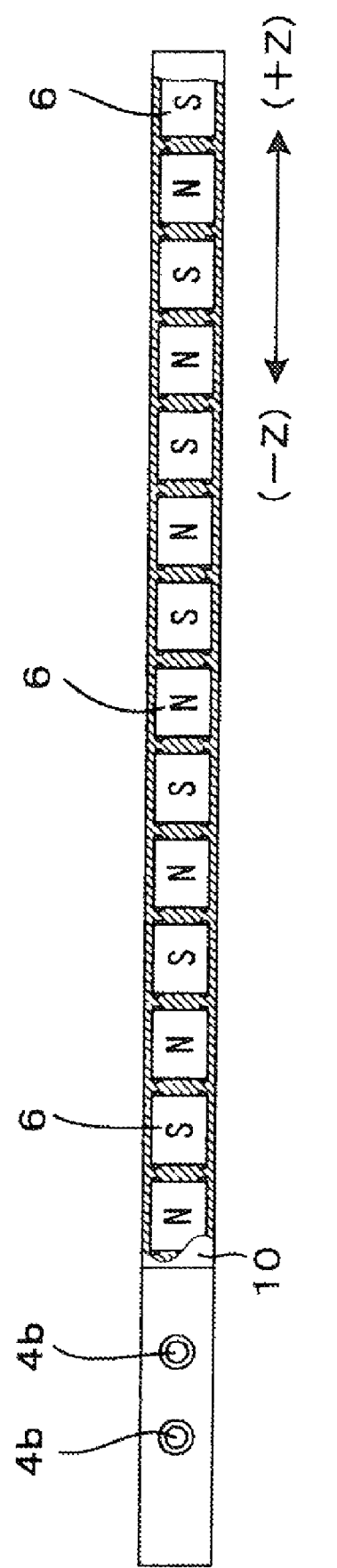
FIG. 7 is a diagram showing the assembled structure of the movable member and the mover in the linear motor illustrated in FIG. 1.
Figure 8:
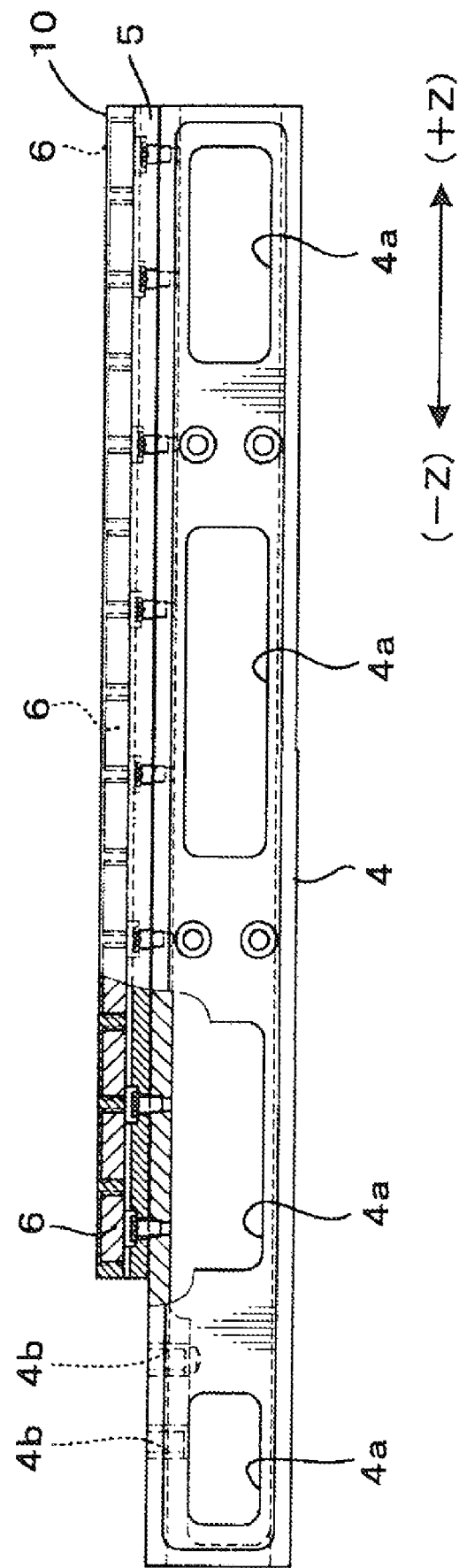
FIG. 8 is a partially broken-out side view showing the assembled structure of the movable member and the mover in the linear motor illustrated in FIG. 1.

Referring next to FIGS. 6 to 8, a yoke 5, which is made of a ferromagnetic material, is attached to the lateral surface which is located one edge side (−Y side) in the widthwise direction Y of the movable base 4. A permanent magnet array 6 is attached to a surface of the yoke 5 in a line, in such a manner that a permanent magnet each having an N-pole opposed to the surface and a permanent magnet having an S-pole opposed to the surface are alternately arranged along the moving direction Z (in the first embodiment, total fourteen permanent magnets). A mover 10 of the linear motor LM is made up of the permanent magnet array 6 and the yoke 5. In the first embodiment, the permanent magnet array 6 is molded within a resin layer constituting an outer shell of the mover 10, to protect surfaces thereof, which makes it possible to effectively prevent damage or the like of the permanent magnet array 6. The resin layer covers the permanent magnet array 6, while leaving a space on the forward side (−Z side) in the moving direction Z with respect to the mover 10, so that a portion of the movable base 4 on the forward side with respect to the mover 10 is exposed.

Two female screw portions 4b are formed in the exposed region of the movable base 4. The female screw portions 4b are one example of coupling means for attaching a driven object to an end of the movable base 4 on the one edge side directly or through a coupling unit 164 (see FIG. 17). For example, in an after-mentioned surface mounter, the coupling unit 164 (see FIG. 17) is coupled to the movable base 4 using the female screw portions 4b, and then a nozzle shaft as a driven object is connected to the coupling unit 164. In other words, a driven object can be attached to the movable base 4 through the coupling unit 164 coupled to the end of the movable base 4 using the female screw portions 4b. This point will be more specifically described in the following "SURFACE MOUNTER" Section.

Referring next to FIG. 2, an armature 3 as one example of a "stator" in the appended claims is disposed on the one edge side in the widthwise direction Y with respect to the mover 10 made up of the yoke 5 and the permanent magnet array 6 as described above. The armature 3 is fixed to the base surface 1a of the base plate 1. The armature 3 comprises a core 3b, a plurality of hollow-shaped bobbins 3b, and a plurality of coils 3c formed by winding an electric wire around respective outer peripheries of the bobbins 3b. The core 3a is formed by laminating in a frontward-rearward direction a plurality of comb-shaped silicon steel plates (unit plates) each having a longitudinal direction extending on a Y-Z plane and along the moving direction Z. A plurality of teeth are formed in a portion of the silicon steel plate lamination on the other edge side (+Y side) in the widthwise direction Y, with regular intervals along the moving direction Z. In the core 3a configured as above, the plurality of teeth are arranged side by side in a line with regular intervals in the moving direction Z to form a tooth array. Also, the plurality of bobbins 3b each pre-wound with the coil 3c are mounted to respective ones of the teeth. In this manner, an array of a plurality of (nine pieces in the first embodiment) teeth of the core 3a and a plurality of coils 3c wound around the tooth array are provided at the same intervals along the moving direction Z to form the armature 3, and the armature 3 is disposed opposed to the mover 10. In the first embodiment, as shown in FIG. 3, the armature 3 is configured such that each of a distal end surface 8 (surface on the +Y side) of the teeth of the core 3a wound with the coil 3c and a counter surface 8' of the permanent magnet array 6 of the mover 10 opposed to the distal end surface 8 become parallel to an X-Z plane which includes the frontward-rearward direction X and the moving direction Z. When a current is applied to the respective coils 3c in a given sequence from a motor controller whose illustration is omitted, a propulsion force in the moving direction Z is generated in the mover 10 by interaction between the magnetic pole of the distal end surface 8 and the magnetic pole of the counter surface 8' arranged as described above, so that the movable base 4 is driven in the moving direction Z.

Figure 9:
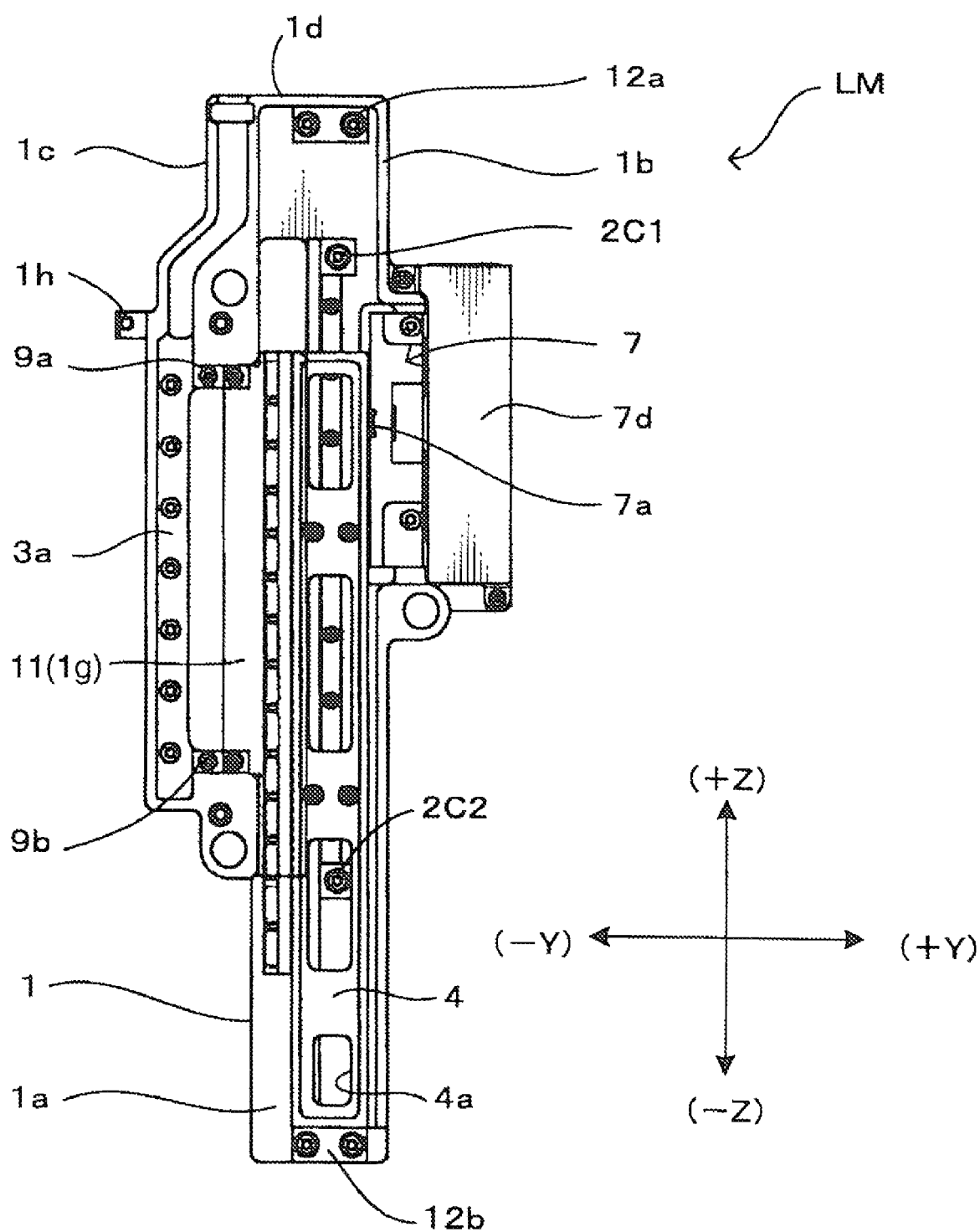
FIG. 9 is a top plan view showing an arrangement relationship between a magnetic plate and each of two sub-teeth in the linear motor illustrated in FIG. 1.

In the first embodiment, the permanent magnet array 6 is used in the mover 10, and the core 3a made of a magnetic material is used in the armature 3 serving as the stator. Thus, a cogging force is generated between the tooth array of the core 3a and the permanent magnet array 6 of the mover 10. As is well known, the "generation of a cogging force" is a phenomenon that a magnetic flux density of the permanent magnet array 6 is changed depending on a position of the teeth of the core 3a, and thereby magnetic energy is changed to cause a pulsation of the electromagnetic force acting on the armature 3. Therefore, in order to reduce a cogging force, two sub-teeth 9a, 9b each made of a magnetic material are provided at respective opposite ends of the tooth array of the armature 3, as shown in FIG. 9. Specifically, the sub-tooth 9a and the sub-tooth 9b are detachably provided on the base surface 1a of the base plate 1, respectively, at a desired position identical to or different from a tooth array pitch, on the backward side (+Z side) of the tooth array, and at a desired position identical to or different from the tooth array pitch, on the forward side (−Z side) of the tooth array, in such a manner that a distance from the permanent magnet array 6 becomes a desired value.

In the linear motor LM configured as above, a plate portion connected to the core 3a extends to a vicinity of the sub-teeth 9a, 9b, so that a magnetic coupling between the core 3a of the armature 3 and each of the sub-teeth 9a, 9b occurs to cause unevenness in magnetic flux density distribution. Thus, it is likely that a stable cogging-force reducing function cannot be obtained simply by arranging the sub-teeth 9a, 9b at given positions. In particular, during acceleration, deceleration or the like, or in a situation where an operating condition (a constant movement speed after acceleration) itself changes, an amount of current flowing through the coils 3c is likely to change and deviate from an assumed value to cause difficulty in desirably forming a magnetic pole of a counter surface of the sub-teeth 9a, 9b opposed to the permanent magnet array 6 or an intensity of the magnet pole, so that a cogging-force reducing effect based on the sub-teeth 9a, 9b is not always obtained. Therefore, in the first embodiment, a magnetic plate 11 is provided between the base plate 1 and each of the sub-teeth 9a, 9b to supplement reducing effect in the cogging-force caused by the sub-teeth 9a, 9b. More specifically, the linear motor is configured as follows.

Referring to FIGS. 5 to 9, a plate-fitting portion 1g is formed on the base surface 1a of the base plate 1 to have a shape approximately equal to a planar shape of the magnetic plate 11 (see FIG. 5). The plate-fitting portion 1g is formed in a position where the magnetic plate 11 is disposed opposed to both the mover 10 and the armature 3 in the frontward-rearward direction X. As shown in FIG. 2, when the magnetic plate 11 is fitted in the plate-fitting portion 1g, a front surface of the magnetic plate 11 is flush with the base surface 1a. The magnet plate 11 provided in the above manner makes it possible to effectively reduce the cogging force by generating not only magnetic flux on the Y-Z plane, which passes through the core 3a, the sub-tooth 9a, one permanent magnet in the permanent magnet array 6, the yoke 5, an adjacent permanent magnet in the permanent magnet array 6, and an adjacent one of the teeth and reaching the core 3a, but also magnet flux on the X-Y plane, which passes through the sub-tooth 9a, one permanent magnet in the permanent magnet array 6, the yoke 5 and the magnetic plate 11 and reaching the sub-tooth 9a.

As above, the movable base 4 is driven in the moving direction Z by interaction of magnetic fluxes generated between the mover 10 and the armature 3. To prevent the movable base 4 from being moved beyond a given moving range, two movement restriction stoppers 12a, 12b are detachably fixed to the base surface 1a of the base plate 1.

Next, with a view to accurately detecting a position of the movable base 4, a detector unit 7 having a sensor 7a and a linear scale 7b to serve as detection means is provided on a side opposite to the armature (i.e., on the +Y side) with respect to the movable base 4.

Referring to FIGS. 2 and 5, the sensor 7a of the detector unit 7 is integrally assembled to a sensor control unit 7c. This assembly (the sensor 7a+the sensor control unit 7c) is adapted to be detachable relative to the recess portion 1e through a cutout 1f formed in the standing wall 1b, as shown in FIG. 5. In the mounted assembly, the sensor 7a faces inside the recess portion 1e of the base plate 1, while the sensor control unit 7c, which is disposed on a side opposite to the linear scale or on the other edge side (+Y side) in the widthwise direction Y with respect to the sensor 7a, is attached to the base plate 1.

The linear scale 7b is provided on a lateral surface of the movable base 4 on the other edge side (+Y side) to extend along the moving direction Z. The sensor 7a is disposed opposed to the linear scale 7b in the widthwise direction Y after the operation of mounting the assembly (the sensor 7a+the sensor control unit 7c). Particularly, in the first embodiment, respective mounting positions of the sensor 7a and the sensor control unit 7c are set such that a surface 7e of the linear scale 7b and a sensing surface 7e' of the sensor 7a opposed to the surface 7e becomes parallel to the X-Z plane including the frontward-rearward direction X and the moving direction Z, as shown in FIG. 4. This makes it possible to allow a region of the linear scale 7b opposed to the sensor 7a to be displaced in response to a displacement of the movable base 4 along the moving direction Z, and to accurately detect a position of the movable base 4 in the moving direction Z based on the displacement of the region of the linear scale 7b.

In order to prevent foreign substances, such as dust or foreign particles, from getting into the sensor control unit 7c, a sensor cover 7d (see FIG. 2) is attached to the standing wall 1b of the base plate 1 after the mounting of the assembly to cover the sensor control unit 7c.

In the first embodiment, the linear scale 7b is attached to the movable base 4, while the sensor 7a is disposed on the base plate 1. Alternatively, the sensor 7a and the linear scale 7b may be arranged in the reverse relation. Also, the detector unit 7 may be configured such that one of the elements (the sensor 7a and the linear scale 7b) thereof is attached to the sliders 2b1, 2b2, instead of attaching it to the movable base 4. A detection scheme of the detector unit 7 may be a magnetic scheme using magnetism, or may be an optical scheme.

As above, in the linear motor LM according to the first embodiment, the attachment position of the mover 10 to the movable base 4 is the lateral surface of the movable base 4 on the one edge side (−Y side), so that the armature 3 is disposed opposed to the mover 10 attached to the lateral surface, in the widthwise direction Y. Thus, a thickness dimension can be set based on a structure where the mover 10 is arranged along a lateral portion of the movable base 4 constituting a part of the movable section, so that structural restrictions in the conventional linear motor can be eliminated to set each of the mover 10 and the armature 3 to a larger size in the frontward-rearward direction X, as compared with the conventional linear motor. Particularly, a depth dimension of the armature 3 can be set to a value equal to a distance between the base surface 1a of the base plate 1a and an upper surface of the movable base 4, so that the number of turns of each of the coils 3c can sufficiently be ensured. Therefore, the first embodiment makes it possible to obtain a linear motor LM having a sufficient propulsion force even with a small thickness.

In the first embodiment, the single linear guide 2 is adapted to move the movable base 4 in the moving direction Z. This makes it possible to have a more simplified structure and a more reduced size in the widthwise direction Y, as compared with the conventional linear motor LM illustrated in FIGS. 18 and 19.

In the first embodiment, the mover and the armature (stator) 3 are disposed on the one edge side (−Y side) with respect to the movable base 4 to drive the movable base 4, while the detector unit 7 is disposed on the other edge side (+Y side) with respect to the movable base 4 to detect the position of the movable base 4. This makes it possible to downsize the linear motor LM in the widthwise direction Y to allow the linear motor LM to have a compact structure.

The linear motor of the present invention is not limited to the above embodiment, but various changes and modifications other than those described above may be made therein without departing from the spirits and scope of the invention.

Figure 19:
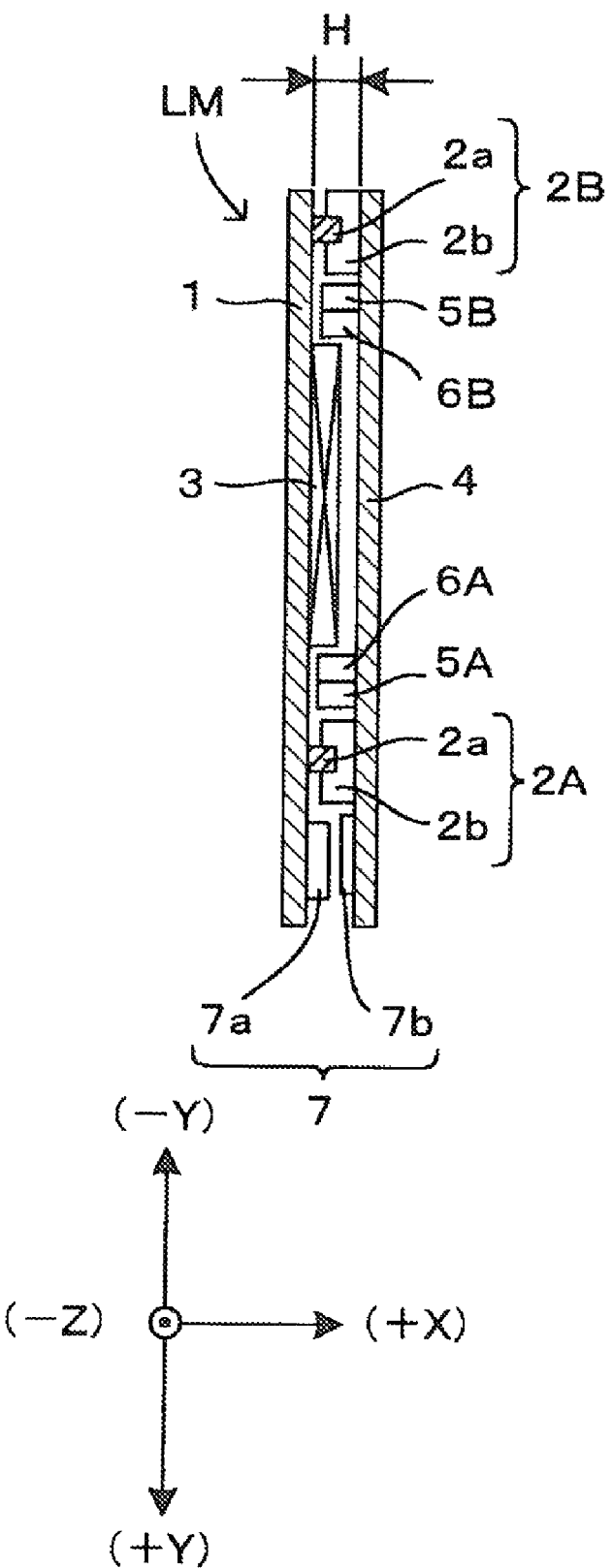
FIG. 19 is a sectional view taken along the arrowed line XIX-XIX in FIG. 18.

For example, as shown in FIG. 4, the detector unit 7 in the first embodiment is provided with the sensor 7a and the linear scale 7b of which a normal line 7f of respective opposed surfaces 7e, 7e' are parallel to a plane including the moving direction Z and the widthwise direction Y. However, the configuration of the detector unit 7 is not limited thereto. For example, the detector unit 7 may be mounted in the same manner as that in the conventional linear motor LM (FIGS. 18 and 19).

In the first embodiment, the female screw portions 4b are provided in the lateral surface of the movable base 4 on the forward side (−Z side) to allow a driven object to be coupled to the movable base 4. Alternatively, a screw portion may be provided in the upper surface of the movable base 4 to allow a driven object to be directly attached to the movable base 4 using the screw portion. A table may also be fixed to the movable base 4 using the screw portion to allow a driven object to be attached to the movable base 4 through the table.

Figure 10:
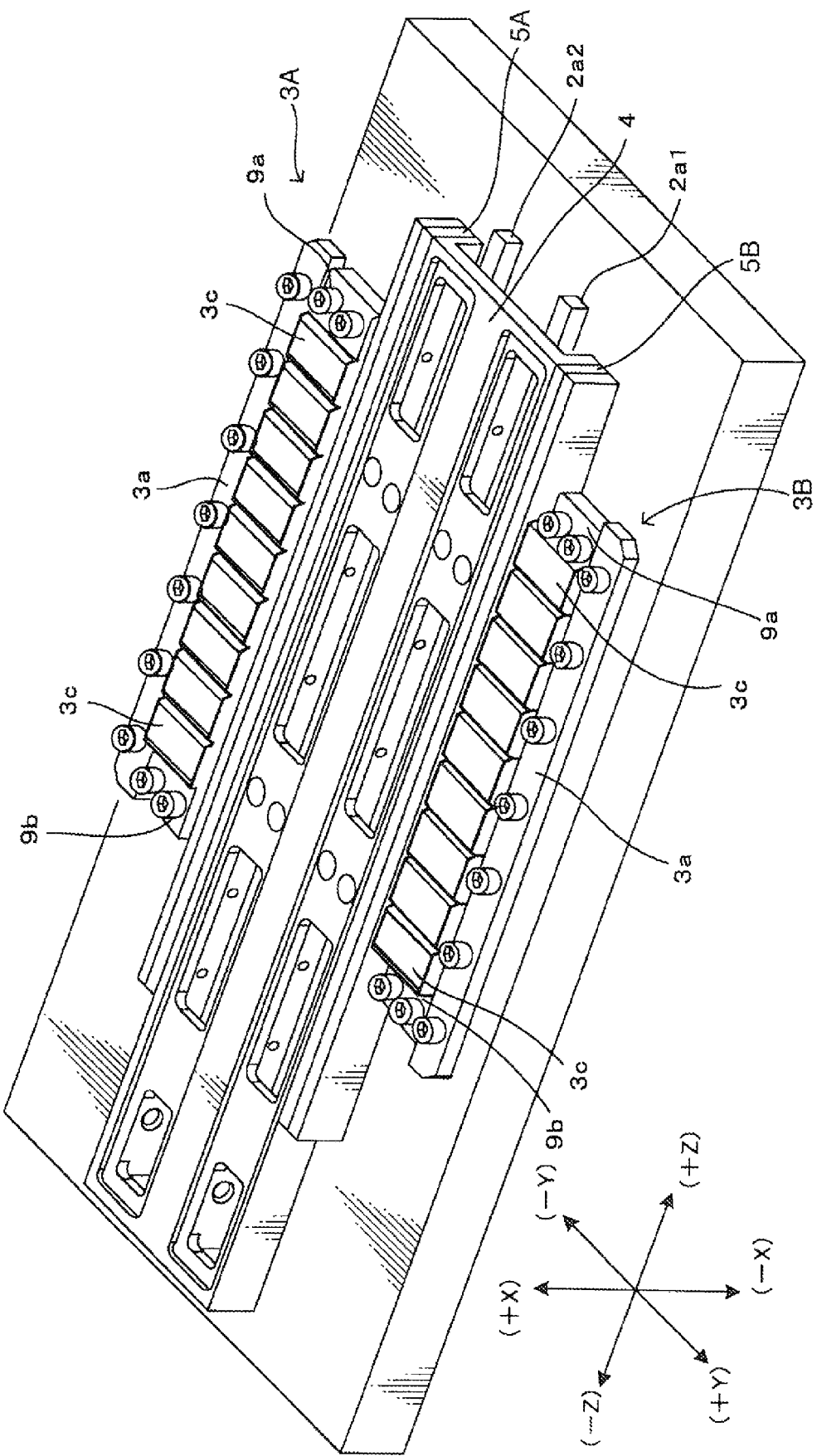
FIG. 10 is a perspective view of a linear motor according to another embodiment of the present invention.

In the first embodiment, the mover and the armature (stator) 3 are disposed only on the one edge side (−Y side) with respect to the movable base 4 to drive the movable base 4. As shown in FIG. 10, the mover and the armature (stator) 3 in another example may be additionally disposed on the other edge side (+Y side) with respect to the movable base 4.

The sectional shape of the movable base 4 may be an H shape.

In a linear motor according to a second embodiment of the present invention, which is shown in FIG. 10, two rails 2a1, 2a1 are provided on a base surface 1a of a base plate 1 in parallel, yet in spaced-apart relation to each other in the widthwise direction Y. A slider, not shown in the figure, is provided in a slidable manner along the rails 2a1, 2a1 in a moving direction Z (while being restricted in the widthwise direction Y and the frontward-rearward direction X). A movable base 4 is attached to the slider, so that the movable base 4 is adapted to be movable back and forth in the moving direction Z. A yoke 5A is attached to a lateral surface of the movable base 4 on the one edge side (−Y side). A permanent magnet array is attached to a surface of the yoke 5A in a line, in such a manner that a permanent magnet having an N-pole opposed to the surface and a permanent magnet 6 having an S-pole opposed to the surface are alternately arranged along the moving direction Z (in the second embodiment, total fourteen permanent magnets). A first mover of the linear motor LM is made up of the permanent magnet array 6A and the yoke 5A. Also, an armature 3A, which corresponds to a "first stator" in the appended claims, is disposed on the one edge side (−Y side) in the widthwise direction with respect to the first mover (the permanent magnet array 6A+the yoke 5A), and fixed to the base surface 1a of the base plate 1. Meanwhile, a stator and a mover on the other edge side (+Y side) with respect to the movable base 4 are configured in the same manner as that on the one edge side (−Y side). Specifically, a yoke 5B is attached to a lateral surface of the movable base 4 on the other edge side (+Y side), and a permanent magnet array 6B is attached to a surface of the yoke 5B along the moving direction Z. A second mover of the linear motor LM is made up of the permanent magnet array 6B and the yoke 5B. Also, an armature 3B, which corresponds to a "second stator" in the appended claims, is disposed on the other edge side (+Y side) in the widthwise direction with respect to the second mover (the permanent magnet array 6B+the yoke 5B), and fixed to the base surface 1a of the base plate 1. This configuration makes it possible to further increase a propulsion force for driving the movable base 4.

In cases where the above configuration is employed, a detector unit 7 can be provided in a mounting manner similar to that in the conventional linear motor (FIGS. 18 and 19). For example, the movable base 4 is formed to have a reverse U-shaped inner space in the same manner as that in the first embodiment. Then, a linear scale is affixed to a central region of a ceiling surface of the inner space, and a sensor is fixed to a surface of the base plate 1 to be disposed opposed to the linear scale at a position between the two rails 2a1, 2a2. In this way, position detection can be achieved.

The yokes 5, 5A, and 5B are attached to the lateral surface of the movable base 4 on the one edge side in the widthwise direction Y in the first embodiment, or to each of the opposite lateral surfaces of the movable base 4 in the widthwise direction Y in the second embodiment, and the permanent magnet arrays 6 are attached to the yokes 5, 5A, and 5B. However, a magnetic circuit may alternatively be formed in such a manner that the movable base 4 is made of a ferromagnetic material, and the permanent magnet array 6 is provided directly on the movable base 4 at a position corresponding to the yoke 5 and along the moving direction Z. Also, the yoke 5 may be attached to respective lateral surfaces of the sliders 2b1, 2b2 on the one edge side in the widthwise direction Y in the first embodiment, or to each of opposite lateral surfaces of the slider (not shown) in the widthwise direction Y in the second embodiment, and then the permanent magnet array 6 may be attached to the yoke 5. In this case, the sliders 2b, 2b1, 2b2 correspond to the "movable section" in the appended claims. Alternatively, a magnetic circuit may be formed in such a manner that the slider is made of a ferromagnetic material, and the permanent magnet array 6 is provided, along the moving direction Z, directly on the slider at a corresponding position.

In the first and second embodiments, the mover 10 is made up of the yoke 5 and the permanent magnet array 6, and the stator is made up of the armature 3. Alternatively, the present invention may be applied to a linear motor configured such that the mover 10 is made up of an armature, and the stator is made up of a yoke and a permanent magnet array.

The standing walls 1b to 1d provided on the base plate 1 may be formed by an integral molding process or may be formed using separate members.

Figure 11:
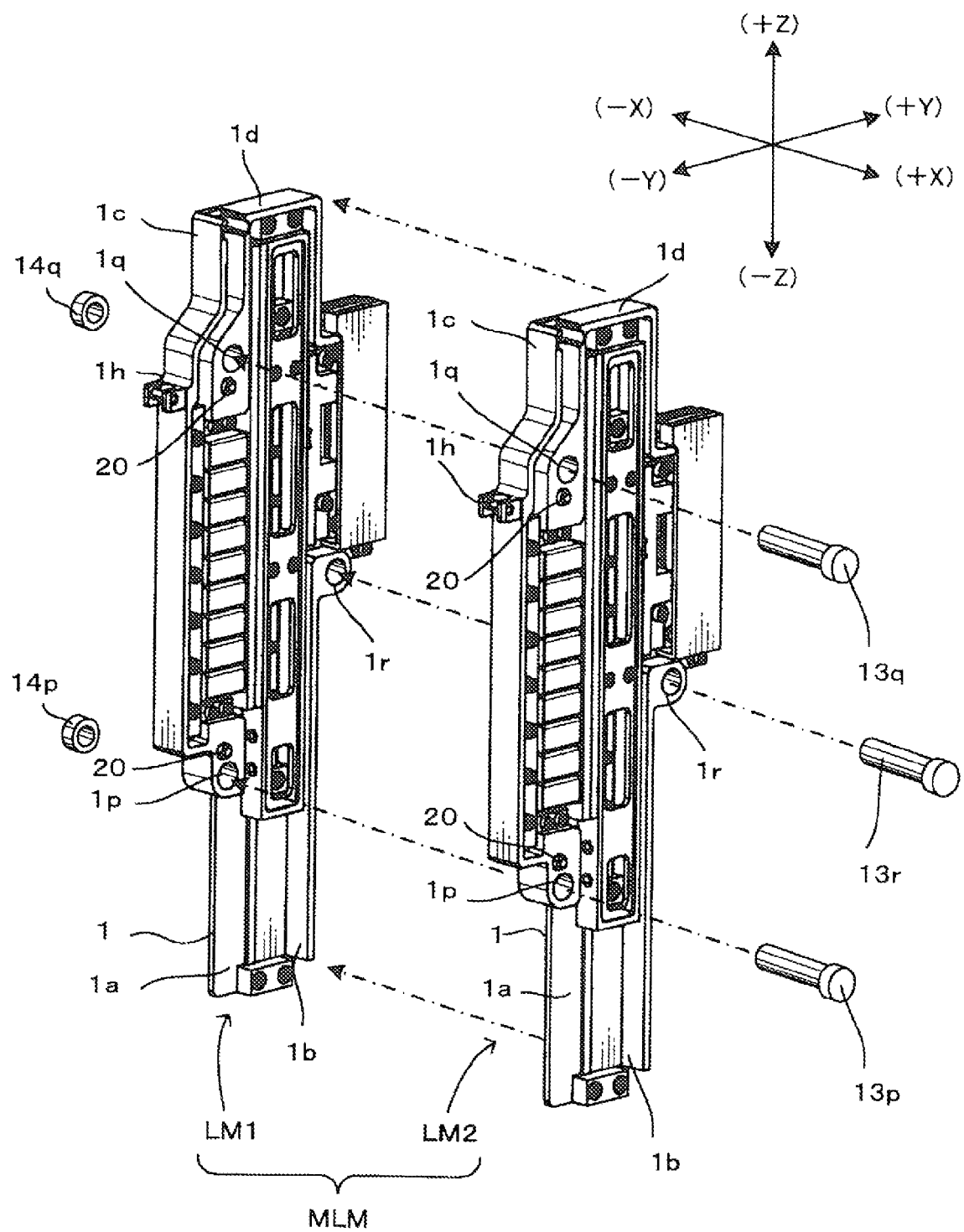
FIG. 11 is a perspective view of a linear motor according to yet another embodiment of the present invention.

Although each of the above embodiments relates to a so-called single-shaft linear motor, two single-shaft linear motors LM1, LM2 each corresponding to the first embodiment may be assembled together to form a multi-shaft linear motor MLM, as shown in FIG. 11.

In a third embodiment of the present invention illustrated in FIG. 11, a multi-shaft linear motor MLM is formed by preparing two single-shaft linear motors LM1, LM2 having the same configuration, and bringing respective front surfaces of three standing walls 1b to 1d of the linear motor LM1 into contact with a rear surface of a base plate 1 of the linear motor LM2 to arrange the linear motors LM1, LM2 in a stacking manner in a frontward-rearward direction.

Two through-holes 21 (see FIG. 5) are formed in respective ones of the base plates 1 of the single-shaft linear motors LM1, LM1 so as to provide two pairs of through-holes 21 opposed to each other in the frontward-rearward direction X, and two positioning pins 20 are fixed to respective ones of the two pairs through-holes while leaving some space on a lower side of each of the through-holes 21. A portion of each of the fixed positioning pins 20 on a frontward side (+X side) protrudes from the through-hole 21. Thus, in an assembling the two linear motors LM1, LM2, the two positioning pins 20 on the linear motor LM1 on a lower side are fitted into respective ones of the through-holes 21 in the linear motor LM2 on an upper side to establish positioning. Also, three through-holes 1p to 1r are formed in the respective base plates 1 of the single-shaft linear motors LM1, LM2 so as to provide three pairs of through-holes 1p to 1r opposed to each other in the frontward-rearward direction. Then, a bolt 13p is inserted into the pair of through-holes 1p in the linear motors LM1, LM2 from the frontward side (+X side) with respect to the linear motor LM2 to penetrate therethrough, and a nut 14p is screwed on a distal end of the bolt 13p from a rearward side (−X side) with respect to the linear motor LM1. As for the remaining pairs of trough-holes 1q, 1r, an operation of inserting each of two bolts 13q, 13r and an operation of screwing a nut are performed in the same manner as that for the pair of through-holes 1p. As above, the linear motors LM1, LM2 are fixedly fastened to each other and integrated together to form a two-shaft linear motor MLM.

As described above, the two-shaft linear motor MLM is formed by arranging the two thin linear motors LM1, LM2 according to the first embodiment in a stacking manner in the frontward-rearward direction X, so that a pitch of the two shafts in the frontward-rearward direction X can be set to a small value. Also, in each of the linear motors LM1, LM2, a depth dimension (a size from the base surface 1a in the frontward-rearward direction X) of the entire elements, such as the mover and the armature (stator) is equal to or less than that of the standing walls 1b to 1d of the base plate 1, and major elements (the movable section, the armature 3 and the mover 10) of the linear motor is received in the recess portion 1e surrounded by the base surface 1a and the standing walls 1b to 1d. This makes it possible to easily perform a motor assembling operation while maintaining accuracy of relative positions of the two shafts at high levels.

The number of single-shaft linear motors to be combined together is not limited to two, but three or more single-shaft linear motors may be combined together to make up a multi-shaft linear motor MLM. For example, a surface mounter as described next is equipped with an upward/downward driving mechanism for driving each of ten suction nozzles in an upward-downward direction to transfer components using the suction nozzles. In this case, a multi-shaft linear motor MLM formed by combining ten single-shaft linear motor LM1 to LM10 together may be used as the upward/downward driving mechanism.

<Surface Mounter>

Figure 12:
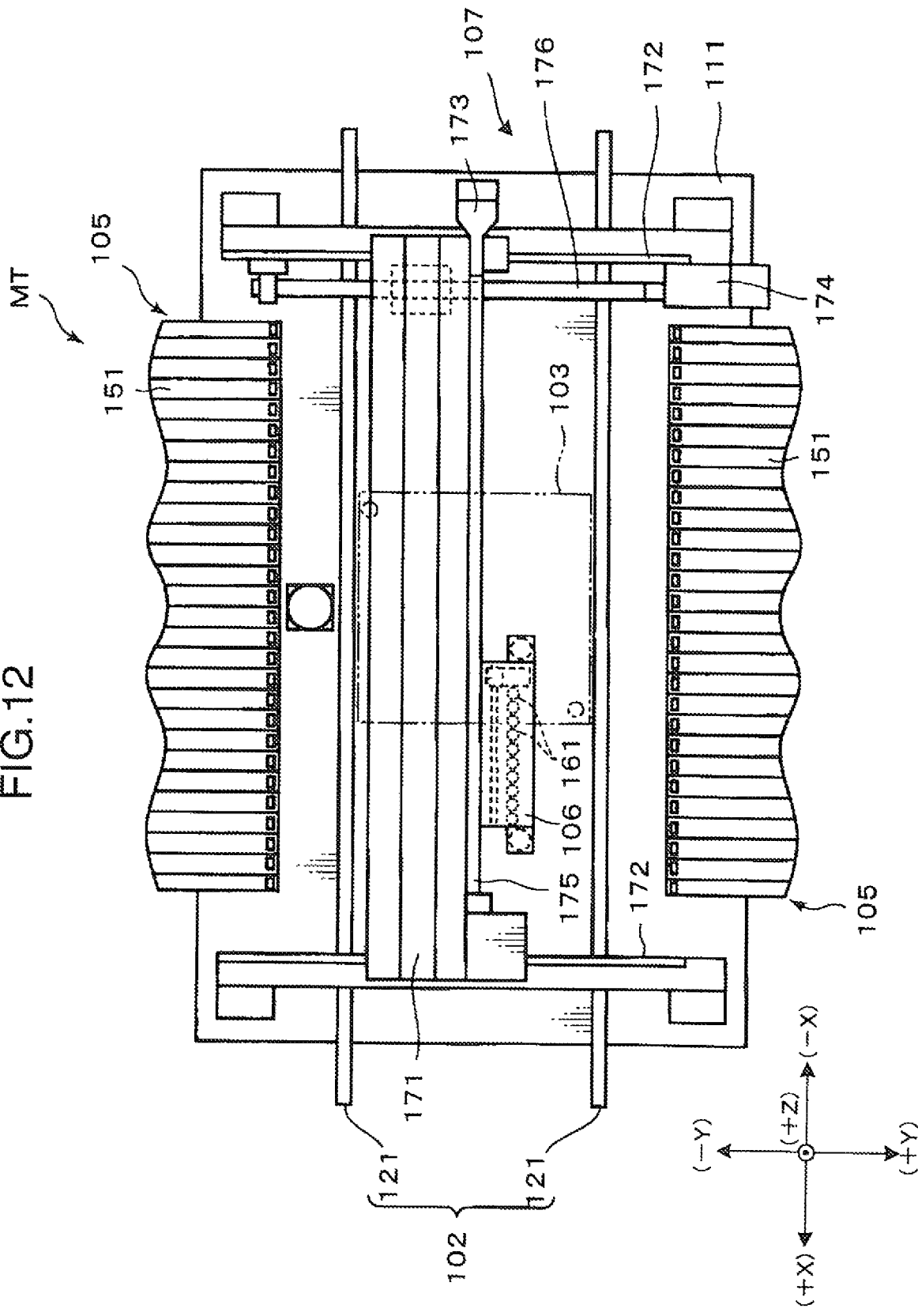
FIG. 12 is a plan view showing a general configuration of a surface mounter which is one example of a component transfer apparatus, according to one embodiment of the present invention.
Figure 13:
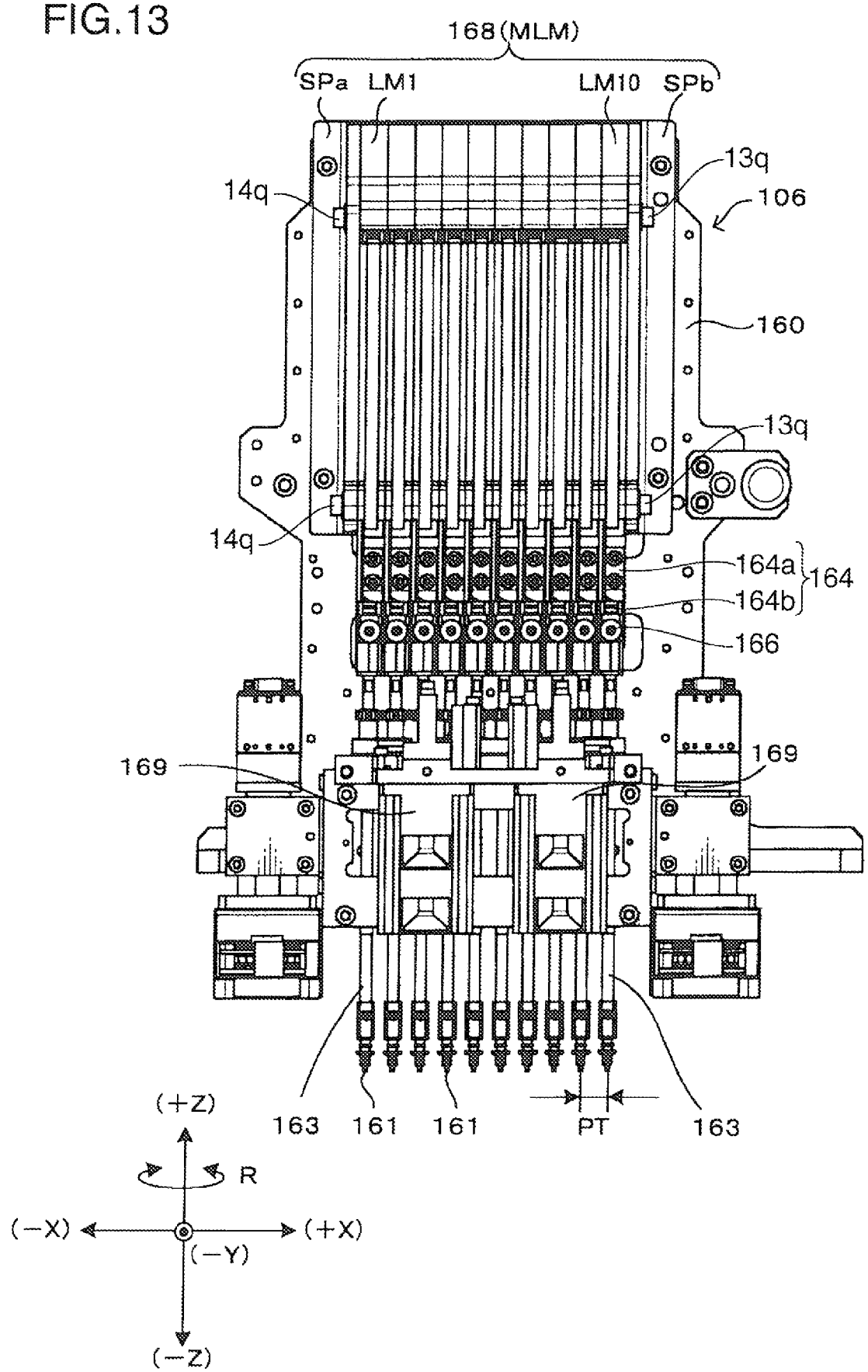
FIG. 13 is a front view of a head unit in the surface mounter illustrated in FIG. 12.
Figure 14:
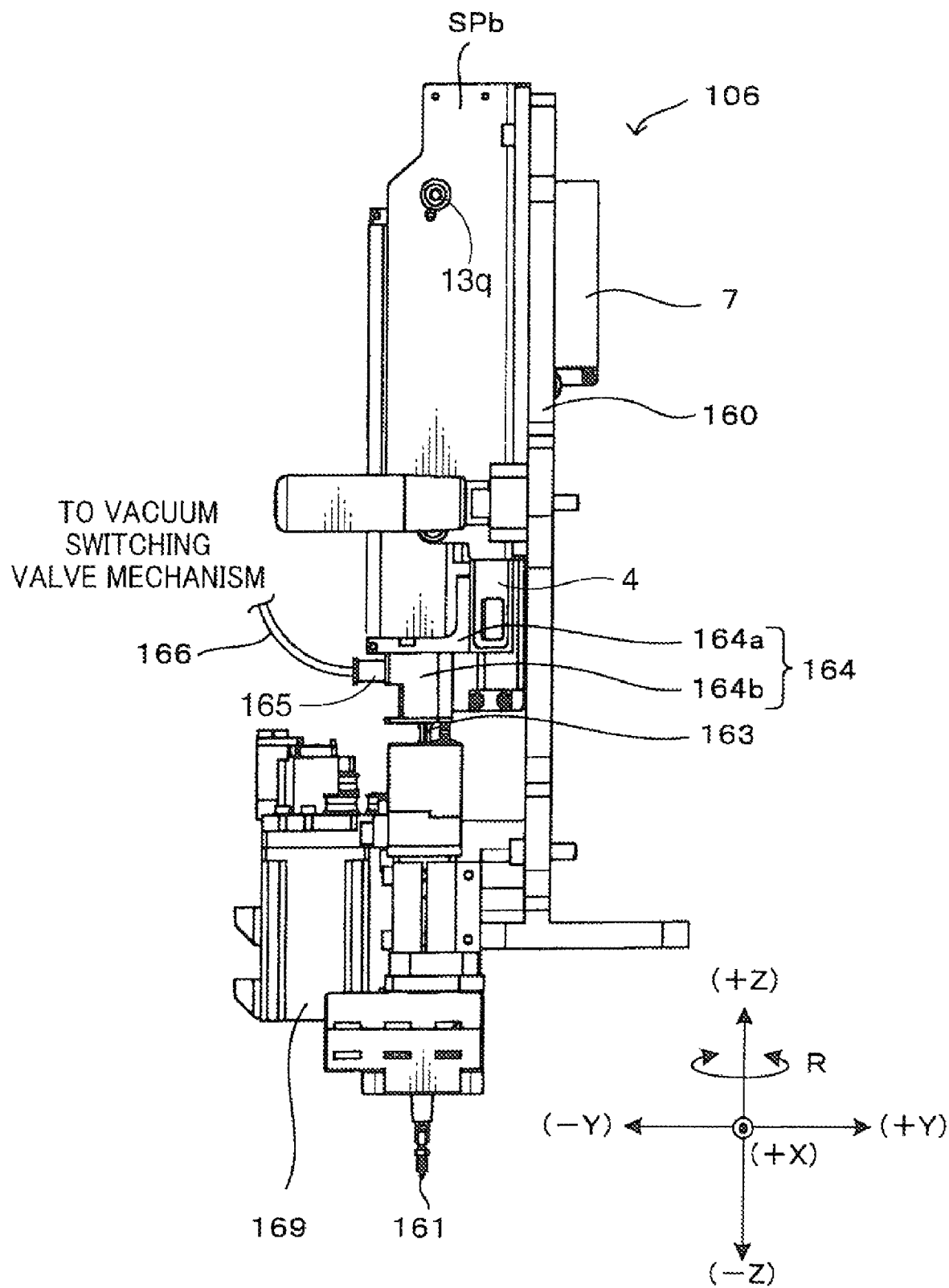
FIG. 14 is a side view of the head unit in the surface mounter illustrated in FIG. 12.
Figure 15:
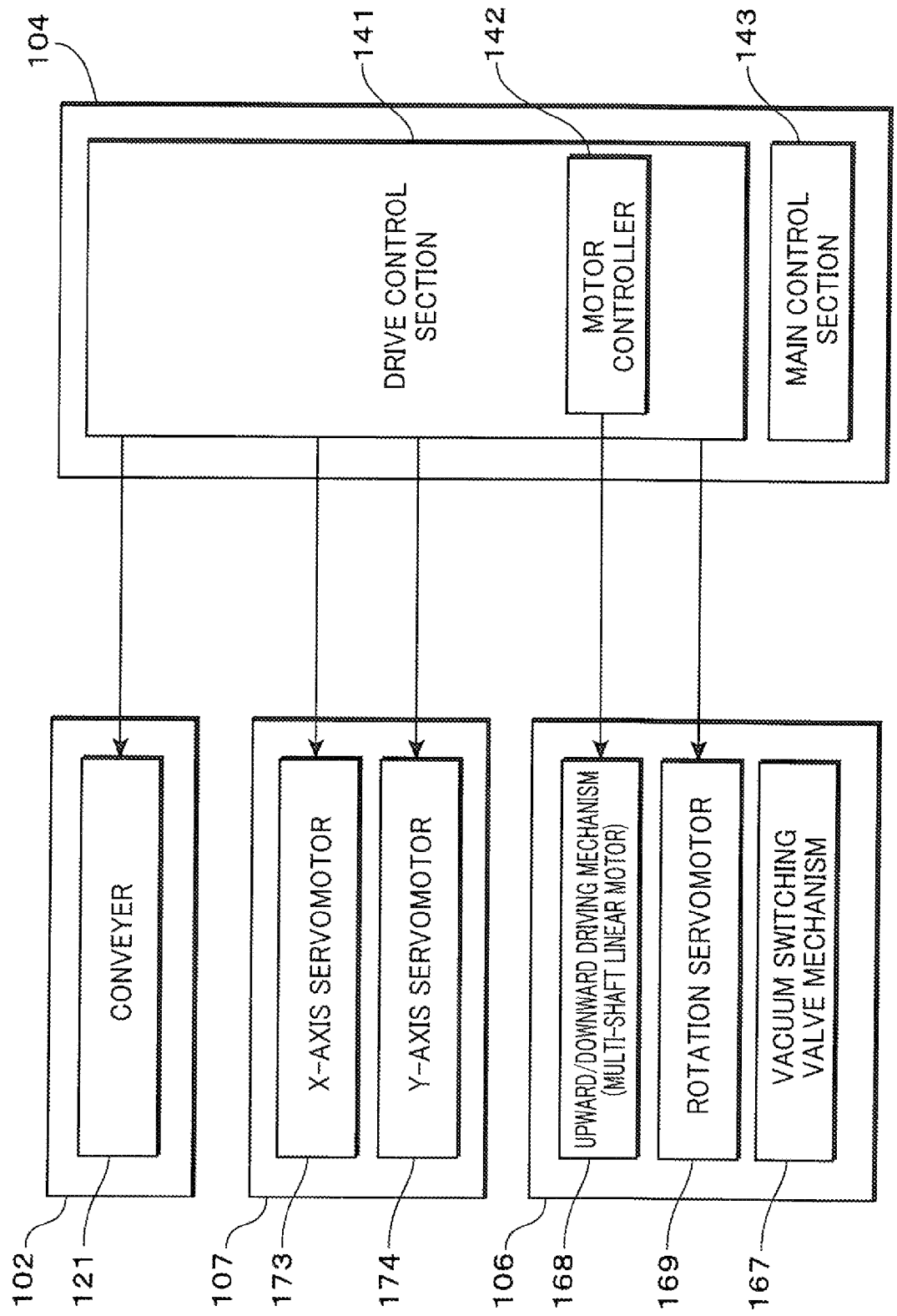
FIG. 15 is a block diagram showing an electrical configuration of the surface mounter illustrated in FIG. 12.

FIG. 12 is a top plan view showing a general configuration of a surface mounter which is one example of a component transfer apparatus, according to one embodiment of the present invention. FIG. 13 and FIG. 14 are a front and a side views of a head unit, respectively. FIG. 15 is a block diagram showing an electrical configuration of the surface mounter illustrated in FIG. 12. In these figures and subsequent illustrative figures, a three-dimensional-XYZ coordinate system in which a vertical direction is defined as the Z-axis, is employed. In a state after the linear motors LM1 to LM10 are set up in the surface mounter, the direction X, the direction Y and the direction Z are aligned with the X-axis, the Y-axis and the Z-axis.

In the surface mounter MT according to this embodiment, a board carrying mechanism 102 is installed on a base 111 to allow a board 103 to be carried in a given carrying direction. In the illustrated example, the carrying direction is along the X-axis direction. More specifically, the board carrying mechanism 102 comprises a pair of conveyers 121, 121 adapted to carry the board 103 in a direction from a right side to a left side on the base 111. These conveyers 121, 121 are controlled by a drive control section 141 of a control unit 104 adapted to control the entire surface mounter MT. Specifically, the conveyers 121, 121 are operable, in response to a drive instruction from the drive control section 141, to carry in the board 103 and then stop the carried-in board 103 at a given mounting-operation position (a position of the board 103 indicated by the two-dot chain line in FIG. 12). The board 103 carried in this manner is fixedly held by a holding device (not shown). Then, an electronic component (whose illustration is omitted) supplied from a component receiving section 105 is transferred to the board 103 by a suction nozzle 161 equipped in a head unit 106. After completion of a mounting operation for all of a plurality of components to be mounted on the board 103, the board carrying mechanism 102 is operable, in response to a drive instruction from the drive control section 141, to carryout the board 103.

The component receiving section 105 is disposed on each of opposite sides of the board carrying mechanism 102. Each of the component receiving sections 105 comprises a large number of tape feeders 151. Each of the tape feeders 151 is provided with a reel (whose illustration is omitted) wound with a tape which receives/holds therein a plurality of electronic components, and adapted to supply the electronic components. Specifically, a plurality of electronic components in the form of small-piece chip, such as integrated circuits (ICs), transistors, resistors or capacitors, are received and held in each of the tapes with certain intervals therebetween. When the tape feeder 151 reels the tape out from the reel toward the head unit 106 along the Y-axis direction, the electronic components in the tape are intermittently fed out to allow the suction nozzle 161 of the head unit 106 to perform an operation of picking up the electronic component.

In this embodiment, in addition to the board carrying mechanism 102, a head driving mechanism 107 is provided. The head driving mechanism 107 is designed to move the head unit 106 in the X- and Y-axis directions over a given range of the base 111. By the movement of the head unit 106, the electronic component sucked by the suction nozzle 161 is carried from a position just above the component receiving section 105 to a position just above the board 103. The head driving mechanism 107 comprises a mounting head-support member 171 extending along the X-axis direction. The mounting head-support member 171 supports the head unit 106 in a movable manner in the X-axis direction. Also, the mounting head-support member 171 is supported by a fixed rail 172 extending in the Y-axis direction, at opposite ends thereof in the X-axis direction, so that it can be moved in the Y-axis direction along the fixed rail 172. The head driving mechanism 107 further comprises an X-axis servomotor 173 serving as a driving source for driving the head unit 106 in the X-axis direction, and a Y-axis servomotor 174 serving as a driving source for driving the head unit 106 in the Y-axis direction. The servomotor 173 is coupled to a ball screw 175, so that, when the servomotor 173 operates in response to an operation instruction from the drive control section 141, the head unit 106 is driven back and forth along the X-axis direction through the ball screw 175. The servomotor 174 is coupled to a ball screw 176, so that, when the servomotor 174 operates in response to an operation instruction from the drive control section 141, the mounting head-support member 171 is driven back and forth along the Y-axis direction through the ball screw 176.

Owing to the head driving mechanism 107, the head unit 106 carries the electronic component to the board 103 and transfer the electronic component to a given position while the suction nozzles 161 suck and hold the electronic components (a component transfer operation). More specifically, the head unit 106 is configured as follows. In the head unit 106 in this embodiment, ten mounting heads each extending in the vertical direction Z are arranged in a line at even intervals in the X-axis direction (the carrying direction of the board 103 by the board carrying mechanism 102). Each tip of the mounting heads is equipped with the suction nozzle 161. As shown in FIGS. 13 and 14, each of the mounting heads comprises a nozzle shaft 163 extending in the Z-axis direction. The nozzle shaft 163 has an air passage formed at the core thereof to extend in an upward direction (+Z side) along an axis thereof. The nozzle shaft 163 has a lower end communicating with the air passage through the suction nozzle 161 connected to the lower end. The upper end is opened and connected to a vacuum suction source and a positive pressure source, through a coupling unit 164, a connection member 165, an air pipe 166, and a vacuum switching valve mechanism 167.

In the head unit 106, an upward/downward driving mechanism 168 is provided to move the nozzle shaft 163 up and down in the Z-axis direction. The upward/downward driving mechanism 168 is operable, under drive-control by a motor controller 142 of the drive control section 141, to move the nozzle shaft 163 up and down along the Z-axis direction, thereby moving the suction nozzle 161 in the Z-axis direction and then set the suction nozzle 161 at a given position. In this embodiment, a multi-shaft linear motor MLM formed by combining ten single-shaft linear motors LM1 to LM10 together is used as the upward/downward driving mechanism 168. Details of this configuration will be described later.

Also, a rotation servomotor 169 is provided to rotate the suction nozzle 161 in an R direction (two-way) in the X-Y plane (about the Z-axis). The rotation servomotor 169 is operable, based on an operation instruction from the drive control section 141 of the control unit 104, to rotate the suction nozzle in the R direction. Thus, the head unit 106 is moved to the component receiving section 105 by the head driving mechanism 107 in the above manner, and then the upward/downward driving mechanism 168 and the rotation servomotor 169 are driven to bring a distal end of the suction nozzle 161 into contact with the electronic component supplied from the component receiving section 105, in an adequate posture.

Figure 16:
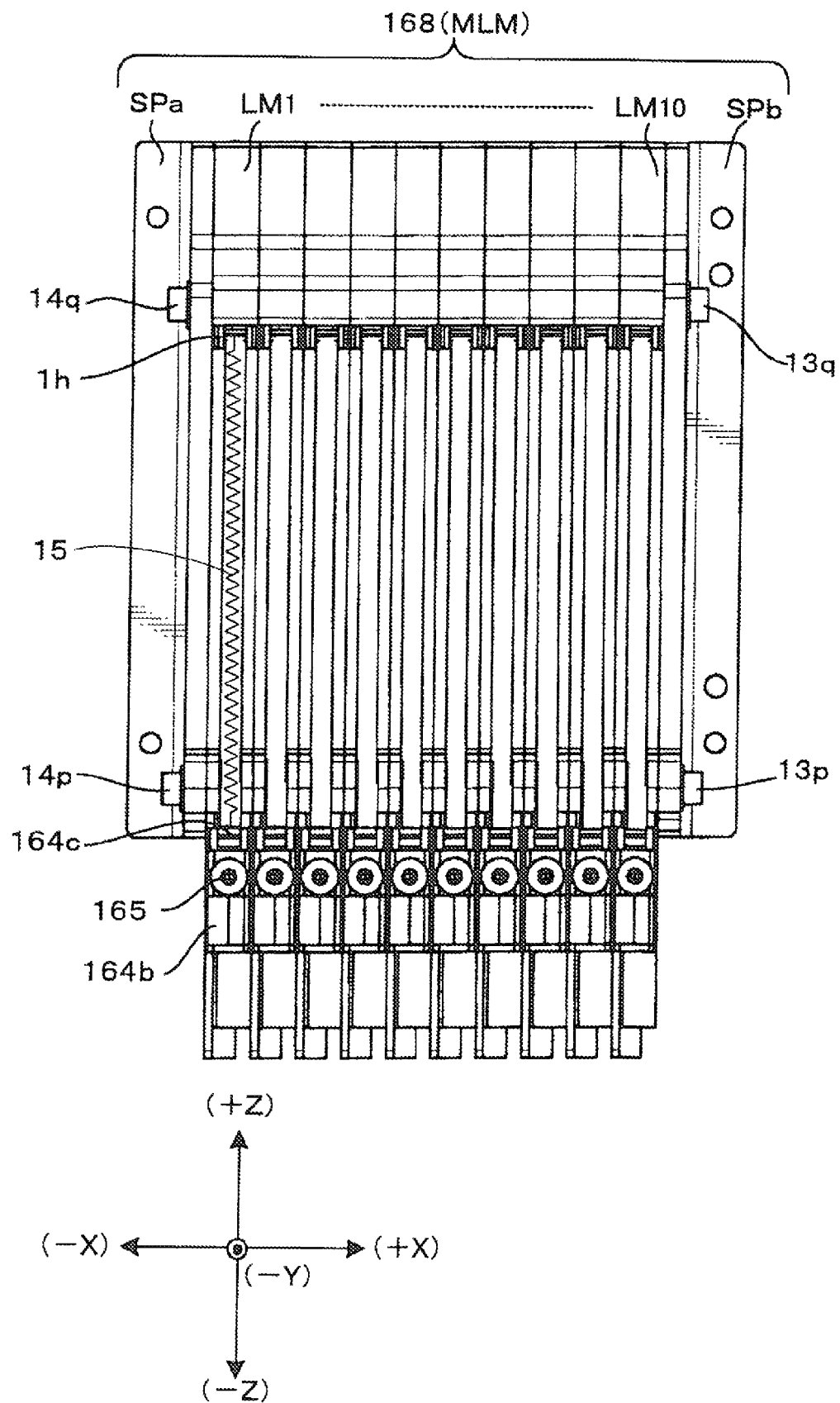
FIG. 16 is a front view showing a structure of an upward/downward driving mechanism in the surface mounter illustrated in FIG. 12.
Figure 17:
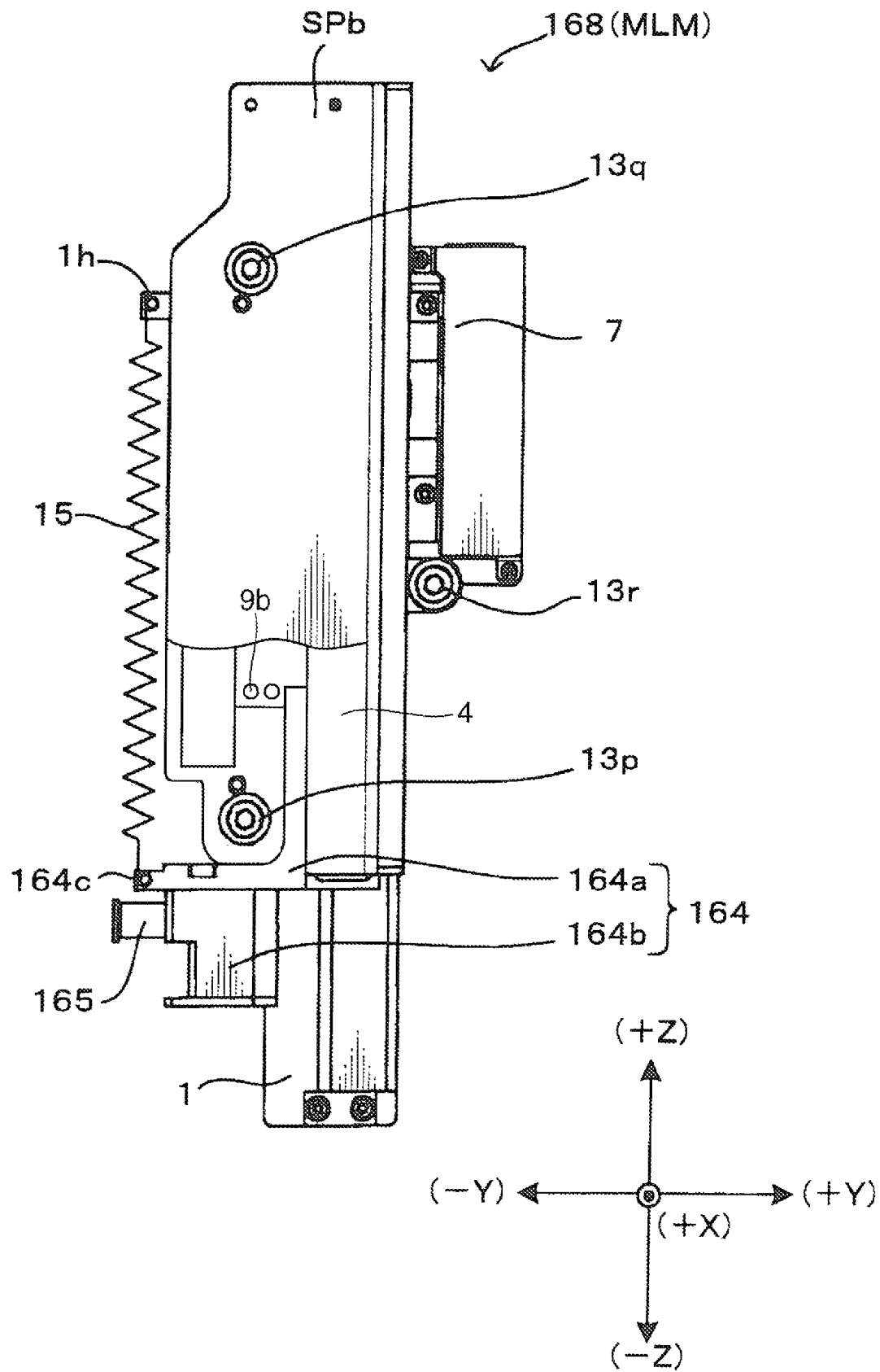
FIG. 17 is a side view showing the structure of the upward/downward driving mechanism in the surface mounter illustrated in FIG. 12.

Referring to FIGS. 16 and 17, the multi-shaft linear motor MLM used as the upward/downward driving mechanism 168 comprises ten single-shaft linear motors LM1 to LM10, and two side plates SPa, SPb. Each of the single-shaft linear motors LM1 to LM10 is equivalent of the single-shaft linear motor LM described in connection with FIG. 1, and the single-shaft linear motors LM1 to LM10 are arranged in the X-axis direction in the same stacking manner as described in connection with FIG. 11. The side plate SPb provided on a top side (+X side) also functions as a cover covering a recess portion 1e (see FIG. 5) of the top linear motor LM 10.

The single-shaft linear motors LM1 to LM10 arranged side by side along the X-axis are sandwiched between the two side plates SPa, SPb. Each of the side plates SPa, SPb and the single-shaft linear motors LM1 to LM10 have three fastening through-holes each formed at a predetermined position to penetrate therethrough along the X-axis direction. Three bolts 13p to 13r are inserted into respective ones of the fastening through-holes from the side of the side plate SPb to penetrate therethrough in the X-axis direction, and fastened by respective ones of three nuts screwed thereon from the side of the side plate SPa, so that the side plate SPa, the single-shaft linear motors LM1 to LM10 and the side plate SPb are integrated together to form the multi-shaft linear motor MLM. The side plate SPa is disposed (on the bottom (−X side) linear motor LM1), and the side plate SPb is disposed on the top (+X side) linear motor LM10).

As shown in FIGS. 13 and 14, the multi-shaft linear motor MLM is attached to a base plate 160 of the head unit 106.

A coupling unit 164 is fixed to each of the movable bases 4 of the multi-shaft linear motor MLM to allow the nozzle shaft 163 to be coupled to a respective one of the movable bases 4.

As shown in FIGS. 13 and 14, the coupling unit 164 comprises an L-shaped block member 164a fixed to an end of the movable base 4 on the forward side (−Z side) in the moving direction Z, and a shaft holder 164b fixed to the block member 164. In this embodiment, each of the members 164a, 164b is one example of a coupling member for coupling the nozzle shaft 163 as a driven object and the movable base 4 as a main element of the movable section.

The block member 164a has a vertical portion extending upwardly along the Z-axis direction, and a horizontal portion extending from a lower end of the vertical portion (the forward side (−Z side) in the moving direction Z) toward the one edge side (−Y side) in the widthwise direction Y, integrally. The vertical portion of the block member 164a is fixed to the movable base 4 by a screw. The shaft holder 164b is attached to a lower surface (−Z side) of the horizontal portion of the block member 164a. Thus, the nozzle shaft 163 is integrally coupled to the movable base 4 of a corresponding one of the linear motors LM1 to LM10 through the coupling unit 164, in an upwardly and downwardly movable manner along the Z-axis direction.

In this embodiment, the multi-shaft linear motor MLM is used as the upward/downward driving mechanism 168, and the moving direction Z of each of the movable bases 4 is set to be parallel to a vertical direction. Therefore, each of the movable bases 4 is constantly biased toward the forward side (−Z side) by gravity. For this reason, in each of the linear motors LM1 to LM10, an upper end of a return spring 15 is engaged with the spring engagement portion 1h of the base plate 1, and a lower end of the return spring 15 is engaged with a spring engagement portion 164c provided on the horizontal portion 164 of the block member 164a, so that the movable base 4 is biased toward the backward side (+Z side), i.e., upwardly, by the return spring 15. Thus, during stop of a current supply to the coils 3c of the linear motors LM1 to LM10, the movable base 4 is received inside the base plate 1. Consequently, each of the suction nozzles 161 is located at an upper position, which prevents each of the suction nozzles 161 or the electronic component sucked by the suction nozzle 161 from causing an accident of interference with the board 103, the conveyer 121 or the like, even if the X-axis servomotor 173 or the Y-axis servomotor 174, for example, is activated under a condition that the upward/downward driving mechanism 168 is nonfunctional due to stop of a current supply.

As shown in FIG. 14, the connection member 165 is attached to a front surface (the −Y side in the widthwise direction Y) of the shaft holder 164b. One end of the air pipe 166 is connected to the connection member 165, to allow an air sent from the vacuum switching valve mechanism 167 through the air pipe 166 to be sent to the shaft holder 164b, or reversely allow an air from the shaft holder 164b to be sucked toward the vacuum switching valve mechanism 167 through the air pipe 166. As above, the vacuum switching valve mechanism 167 and the suction nozzles 161 are connected to each other by the air pipe 166, an air path (whose illustration is omitted) inside the shaft holder 164b, and the nozzle shaft 163. This allows a positive pressure or reversely a negative pressure to be supplied to the suction nozzle 161.

In the surface mounter configured as above, owing to a program pre-stored in a memory of the control unit 104, a main control section 143 of the control unit 104 controls each section of the surface mounter to move back and forth the head unit 106 between a position just above the component receiving section 105 and a position just above the board 103. Also, stopping at the position just above the component receiving section 105, the head unit 106 controls the upward/downward driving mechanism 168 and the rotation servomotor 169 to bring, in an adequate posture, the distal end of the suction nozzle 161 into contact with the electronic component supplied from the component receiving section 105, and to provide a negative-pressure suction force to the suction nozzle 161 to allow the electronic component to be held by the suction nozzle 161. Sucking and holding the electronic component, the head unit 106 moves to the position just above the board 103, and transfers the electric component to a given position. In this manner, the component transfer operation of transferring the electronic component from the component receiving section 105 to a component mounting region of the board 103 is repeatedly performed.

As above, the surface mounter according to this embodiment is configured to drive the nozzle shaft 163 up and down in the Z-axis direction using the multi-shaft linear motor MLM formed by arranging, in a stacking manner in the frontward-rearward direction X, the ten linear motors LM1 to LM10 each having the same configuration as that of the linear motor LM illustrated in FIG. 1. Therefore, the following functions/effects can be obtained. That is, each of the linear motors LM1 to LM10 has a sufficient propulsion force even with a small thickness as described above. This makes it possible to transfer a relatively heavy component as well as a lightweight component by the suction nozzle 161 attached to a forward end of the nozzle shaft 163. In addition, based on a reduction in thickness of the linear motors LM1 to LM10, reductions in size and weight of the head unit 106 can be facilitated. This contributes to a reduction in size of the surface mounter, and allows a movement speed in both the direction X and the direction Y to be increased, which significantly contributes to a reduction in mounting time. Furthermore, the linear motors LM1 to LM10 each having a shape with a small depth dimension are arranged in a stacking manner. This makes it possible to arrange the movable bases 4 at a small pitch in the frontward-rearward direction X, and thereby reduce a pitch PT of the nozzle shafts 163 and the suction nozzles 161 coupled to the respective ones of the movable bases 4, in the frontward-rearward direction X.

<Other Applications>

In the above embodiment, the present invention is applied to a surface mounter MT functioning as a component transfer apparatus. However, applications of the present invention are not limited thereto, but the present invention may be applied to any other suitable type of component transfer apparatus, such as an IC handler.

As described above, according to one aspect of the present invention, there is provided a linear motor which is provided with a magnetic body and an armature. The liner motor is adapted to produce a force causing the magnetic body and the armature to be relatively displaced along a given linear moving direction by interaction of magnetic fluxes generated between the magnetic body and the armature during an operation of supplying electric power to the armature. The linear motor comprises: a base plate adapted to set the moving direction on a base surface thereof; a movable section attached to the base plate in a relatively movable manner reciprocating along the moving direction with respect to the base plate; a mover, which is disposed on a lateral surface of the movable section with respect to one side of a widthwise direction of the base surface perpendicular to the moving direction, formed as one of the magnetic body and the armature; and a stator, which is provided on the base surface of the base plate to be disposed opposed to the mover from the one edge side toward the other edge side in the widthwise direction, formed as other one of the magnetic body and the armature to extend along the moving direction.

In a preferred embodiment, the linear motor comprises: a linear-shaped rail fixed to the base plate to extend along the moving direction with respect to the base surface; a slider provided along the rail in a movable manner reciprocating along the moving direction; and a movable base, which is constituting a part of the movable section, attached to the slider. The mover is attached to a lateral surface of the movable base on the one edge side in the widthwise direction.

In a preferred embodiment, the linear motor comprises: a linear-shaped rail fixed to the base plate to extend along the moving direction with respect to the base surface; and a slider, which is constituting a part of the movable section, provided along the rail in a movable manner reciprocating along the moving direction, wherein the mover is attached to a lateral surface of the slider on the one edge side in the widthwise direction.

In a preferred embodiment, the linear motor further comprises a standing wall provided on an outer edge portion of the base plate to extend in a frontward direction of the base plate, wherein a size of the standing wall in the frontward-rearward direction is set to be equal to or greater than a depth dimension of the stator.

In a preferred embodiment, the linear motor further comprises detection means which includes a linear scale provided on one of the base plate and the movable section, and a sensor provided on the other of the base plate and the movable section to be disposed opposed to the linear scale along the widthwise direction. The detection means is adapted to detect a relative position of the linear scale and is operable to detect a position of the movable section in the moving direction, based on the detection of the sensor.

In a preferred embodiment, one of the linear scale and the sensor is provided on a lateral surface of the movable section on the other edge side in the widthwise direction, and the linear scale and the sensor are disposed to allow each of opposed surfaces of the linear scale and the sensor to be located in parallel adjacent relation to each other.

In a preferred embodiment, the linear motor further comprises a sensor control unit adapted to control the sensor, wherein: the linear scale is provided on the lateral surface on the other edge side; the sensor is disposed opposed to the linear scale from the other edge side toward the one edge side in the widthwise direction; and the sensor control unit is disposed on a side opposite to the linear scale with respect to the sensor.

In a preferred embodiment, the linear motor further comprises a standing wall provided on an outer edge portion of the base plate to extend in a frontward direction of the base plate, wherein: a size of the standing wall in the frontward-rearward direction is set to be equal to or greater than a depth dimension of the stator; and the standing wall is provided with a mounting portion adapted to allow the sensor control unit to be detachably attached thereto.

In a preferred embodiment, when the mover is defined as a first mover, and the stator is defined as a first stator, the linear motor further comprises: a second mover provided along a lateral surface of the movable section on the other edge side in the widthwise direction, the second mover formed as one of a magnetic body and an armature which are different from the first mover and the first stator; and a second stator provided on the other edge side of the stationary section in the widthwise direction, and formed as other one of the magnetic body and the armature which are different from the first mover and the first stator, whereby the movable section is driven in the moving direction by interaction of magnetic fluxes generated between the first mover and the first stator and interaction of magnetic fluxes generated between the second mover and the second stator.

In a preferred embodiment, the linear motor is adapted to move a driven object in the moving direction, wherein the driven object is detachably attached to the movable section through coupling means.

In a preferred embodiment, the coupling means includes a coupling member adapted to couple the driven object to the movable section.

In a preferred embodiment, the coupling means includes a screw section adapted to fix the coupling member to an end of the movable section along the moving direction.

According to another aspect of the present invention, there is provided a component transfer apparatus for transferring a component from a component receiving section to a component mounting area. The component transfer apparatus comprises: a head unit including a base member, a nozzle shaft supported movably relative to the base member in an upward-downward direction, the nozzle shaft adapted to provide a negative pressure, supplied through a negative-pressure pipe connected to a backward end thereof, with a suction nozzle attached to a forward end thereof, and an upward/downward driving mechanism adapted to drive the nozzle shaft in the upward-downward direction; and head driving means adapted to move the head unit between a position just above the component receiving section and a position just above the component mounting area. The upward/downward driving mechanism is the above linear motor. The base plate of the linear motor is attached to the base member in such a manner that the moving direction becomes parallel to the upward-downward direction. The movable section of the linear motor is coupled to the nozzle shaft.

The above embodiments are just preferred specific examples of the present invention, and the present invention is not limited to the above embodiments. It is understood that various changes and modifications may be made therein within the scope of the present invention as defined in the appended claims.

The invention claimed is:

1. A linear motor provided with a magnetic body and an armature, the linear motor being adapted to produce a force causing the magnetic body and the armature to be relatively displaced along a given linear moving direction by interaction of magnetic fluxes generated between the magnetic body and the armature during an operation of supplying electric power to the armature, comprising:

a base plate having a thin tray-shape, said base plate being adapted to set the moving direction on a base surface thereof;

a movable section attached to the base plate in a relatively movable manner reciprocating along the moving direction with respect to the base plate;

a mover disposed on a lateral surface of the movable section with respect to one side of a widthwise direction of the base surface, said widthwise direction is perpendicular to the moving direction and to a frontward-rearward direction that is perpendicular to the base surface, the mover formed as one of the magnetic body and the armature;

a stator provided on the base surface of the base plate to be disposed opposed to the mover from one edge side toward another edge side in the widthwise direction to downsize the linear motor in the frontward-rearward direction to allow the linear motor to have a thin structure, the stator formed as the other of the magnetic body and the armature to extend along the moving direction;

at least a sub-tooth provided on the base surface of the base plate, said sub-tooth is adapted to reduce the cogging-force which occurs during the operation; and a magnetic plate provided between the base plate and said sub-tooth so that the magnetic plate supplements the cogging-force reducing effect by said sub-tooth.

2. The linear motor as defined in claim 1 further comprising:

a linear-shaped rail fixed to the base plate to extend along the moving direction with respect to the base surface;

a slider provided along the rail in a movable manner reciprocating along the moving direction; and
a movable base constituting a part of the movable section, the movable base being attached to the slider,
wherein the mover is attached to a lateral surface of the movable base on the one edge side in the widthwise direction.

3. The linear motor as defined in claim 1 further comprising:
a linear-shaped rail fixed to the base plate to extend along the moving direction with respect to the base surface; and
a slider constituting a part of the movable section, the slider being provided along the rail in a movable manner reciprocating along the moving direction,
wherein the mover is attached to a lateral surface of the slider on the one edge side in the widthwise direction.

4. The linear motor as defined in claim 1, further comprising:
a standing wall provided on an outer edge portion of the base plate to extend in a frontward direction of the base plate,
wherein a size of the standing wall in the frontward-rearward direction is set to be equal to or greater than a depth dimension of the stator.

5. The linear motor as defined in claim 1 further comprising:
detection unit which includes a linear scale provided on one of the base plate and the movable section, and a sensor provided on the other of the base plate and the movable section to be disposed opposed to the linear scale along the widthwise direction, the detection unit adapted to detect a relative position of the linear scale, and the detection unit being operable to detect a position of the movable section in the moving direction, based on the detection of the sensor.

6. The linear motor as defined in claim 5, wherein
one of the linear scale and the sensor is provided on a lateral surface of the movable section on the other edge side in the widthwise direction; and
the linear scale and the sensor are disposed to allow each of opposed surfaces of the linear scale and the sensor to be located in parallel adjacent relation to each other.

7. The linear motor as defined in claim 6 further comprises:
a sensor control unit adapted to control the sensor, wherein:
the linear scale is provided on the lateral surface on the other edge side;
the sensor is disposed opposed to the linear scale from the other edge side toward the one edge side in the widthwise direction; and
the sensor control unit is disposed on a side opposite to the linear scale with respect to the sensor.

8. The linear motor as defined in claim 7 further comprises:
a standing wall provided on an outer edge portion of the base plate to extend in a frontward direction of the base plate,
wherein:
a size of the standing wall in the frontward-rearward direction is set to be equal to or greater than a depth dimension of the stator; and
the standing wall is provided with a mounting portion adapted to allow the sensor control unit to be detachably attached thereto.

9. The linear motor as defined in claim 1, wherein the mover is defined as a first mover, the stator is defined as a first stator, and wherein the linear motor includes:
a second mover provided along a lateral surface of the movable section on the other edge side in the widthwise direction, the second mover formed as one of a magnetic body and an armature which are different from the first mover and the first stator; and
a second stator provided on the other edge side of a stationary section in the widthwise direction, and formed as other one of the magnetic body and the armature which are different from the first mover and the first stator,
whereby the movable section is driven in the moving direction by interaction of magnetic fluxes generated between the first mover and the first stator and interaction of magnetic fluxes generated between the second mover and the second stator.

10. The linear motor as defined in claim 1, wherein the linear motor is adapted to move a driven object in the moving direction, and wherein the driven object is detachably attached to the movable section through coupling unit.

11. The linear motor as defined in claim 10, wherein the coupling unit includes a coupling member adapted to couple the driven object to the movable section.

12. The linear motor as defined in claim 11, wherein the coupling unit includes a screw section adapted to fix the coupling member to an end of the movable section along the moving direction.

13. A component transfer apparatus for transferring a component from a component receiving section to a component mounting area, comprising:
a head unit including a base member, a nozzle shaft supported movably relative to the base member in an upward-downward direction, a suction nozzle attached to a downward end of the nozzle shaft, set suction nozzle is adapted to be supplied with a negative pressure through a negative-pressure pipe connected to the nozzle shaft, and an upward/downward driving mechanism adapted to drive the nozzle shaft in the upward-downward direction; and
head driving unit adapted to move the head unit between a position just above the component receiving section and a position just above the component mounting area,
wherein:
the upward/downward driving mechanism is a linear motor provided with a magnetic body and an armature, the linear motor adapted to produce a force causing the magnetic body and the armature to be relatively displaced along a given linear moving direction by interaction of magnetic fluxes generated between the magnetic body and the armature during an operation of supplying electric power to the armature,
wherein the linear motor includes:
a base plate adapted to set the moving direction on a base surface thereof; a movable section attached to the base plate in a relatively movable manner reciprocating along the moving direction with respect to the base plate;
a mover disposed on a lateral surface of the movable section with respect to one side of a widthwise direction of the base surface perpendicular to the moving direction, the mover formed as one of the magnetic body and the armature; and
a stator provided on the base surface of the base plate to be disposed opposed to the mover from one edge side toward another edge side in the widthwise direction, the stator formed as the other of the magnetic body and the armature to extend along the moving direction;
the base plate of the linear motor is attached to the base member in such a manner that the moving direction becomes parallel to the upward-downward direction;

the movable section of the linear motor is coupled to the nozzle shaft;

at least a sub-tooth provided on the base surface of the base plate, said sub-tooth is adapted to reduce the cogging-force which occurs during operation; and a magnetic plate provided between the base plate and said sub-tooth so that the magnetic plate supplements the cogging-force reducing effect by said sub-tooth.

14. A component transfer apparatus for transferring a component from a component receiving section to a component mounting area, comprising:

a head unit including a base member, a plurality of nozzle shafts, each of which is supported movably relative to the base member in an upward-downward direction, a suction nozzle attached to a downward end of each nozzle shaft, said suction nozzle is adapted to be supplied with a negative pressure through a negative-pressure pipe connected to the corresponding nozzle shaft, and an upward/downward driving mechanism adapted to drive independently each of the nozzle shafts in the upward-downward direction; and head driving unit adapted to move the head unit between a position just above the component receiving section and a position just above the component mounting area, wherein:

the upward/downward driving mechanism is a multi-shaft linear motor formed by combining a plurality of said linear motors provided with a magnetic body and an armature, the linear motor adapted to produce a force causing the magnet body and the armature to be relatively displaced along a given linear moving direction by interaction of magnetic fluxes generated between the magnetic body and the armature during an operation of supplying electric power to the armature, wherein the linear motor includes:

a base plate having a thin tray-shape, said base plate being adapted to set the moving direction on a base surface thereof, a movable section attached to the base plate in a relatively movable manner reciprocating along the moving direction with respect to the base plate;

a mover disposed on a lateral surface of the movable section with respect to one side of a widthwise direction of the base surface, said widthwise direction is perpendicular to the moving direction and to a frontward-rearward direction that is perpendicular to the base surface, the mover formed as one of the magnetic body and the armature;

a stator provided on the base surface of the base plate to be disposed opposed to the mover from one edge side toward another edge side in the widthwise direction so as to downsize the linear motor in the frontward-rearward direction to allow the linear motor to have a thin structure, the stator formed as the other of the magnetic body and the armature to extend along the moving direction;

at least a sub-tooth provided on the base surface of the base plate, said sub-tooth is adapted to reduce the cogging-force which occurs during the operation; and a magnetic plate provided between the base plate and said sub-tooth, said magnetic plate supplements the cogging-force reducing effect by said sub-tooth, the multi-shaft linear motor is provided with means for stacking said plural linear motor in such a manner that each of said linear motors is positioned to be stacked in the frontward-rearward direction;

each base plate of the linear motors is respectively attached to the base member in such a manner that the moving direction becomes parallel to the upward-downward direction; and each of the movable sections of the linear motors is coupled to the corresponding nozzle shaft.

* * * * *